(12) United States Patent
Imamura et al.

(10) Patent No.: US 11,015,515 B2
(45) Date of Patent: May 25, 2021

(54) COMBUSTION CHAMBER STRUCTURE FOR ENGINE

(71) Applicant: Mazda Motor Corporation, Hiroshima (JP)

(72) Inventors: Satoshi Imamura, Hiroshima (JP); Masaki Fukuma, Hiroshima (JP); Yasushi Nakahara, Higashihiroshima (JP); Atsushi Inoue, Aki-gun (JP); Kota Matsumoto, Aki-gun (JP); Michiharu Kawano, Hiroshima (JP); Yuya Honda, Hiroshima (JP); Futa Nishi, Hiroshima (JP)

(73) Assignee: Mazda Motor Corporation, Hiroshima (JP)

(*) Notice: Subject to any disclaimer, the term of this patent is extended or adjusted under 35 U.S.C. 154(b) by 0 days.

(21) Appl. No.: 16/678,305

(22) Filed: Nov. 8, 2019

(65) Prior Publication Data

US 2020/0158007 A1 May 21, 2020

(30) Foreign Application Priority Data

Nov. 16, 2018 (JP) .............................. JP2018-215642

(51) Int. Cl.
*F02B 23/06* (2006.01)
*F02D 41/40* (2006.01)
(Continued)

(52) U.S. Cl.
CPC ............ *F02B 23/063* (2013.01); *F02B 11/00* (2013.01); *F02B 23/0624* (2013.01);
(Continued)

(58) Field of Classification Search
CPC .... F02B 11/00; F02B 17/005; F02B 23/0624; F02B 23/063; F02B 23/0642;
(Continued)

(56) References Cited

U.S. PATENT DOCUMENTS

| 5,921,215 A | * | 7/1999 | Wirth ................... F02B 23/101 123/298 |
| 5,979,399 A | * | 11/1999 | Piock ...................... F02F 3/26 123/301 |

(Continued)

FOREIGN PATENT DOCUMENTS

| JP | 10317970 A | * | 12/1998 | ............ F02B 23/104 |
| JP | 11182336 A | * | 7/1999 | ............ F02B 23/104 |

(Continued)

*Primary Examiner* — John M Zaleskas
(74) *Attorney, Agent, or Firm* — Alleman Hall Creasman & Tuttle LLP

(57) ABSTRACT

A combustion chamber structure for an engine includes a combustion chamber where SI combustion by spark ignition and CI combustion by self-ignition are conducted. A crown surface includes a cavity recessed to have a bowl-shape; a pair of first raised portions having a mound-shape along a pent roof shape; and a second raised portion provided to protrude at a position orthogonal to a ridge extending direction of the pair of first raised portions. With a height of the first raised portion relative to a height position of a deepest portion of the cavity being represented as H1 and a height of the second raised portion being represented as H2, H1/H2 as a ratio of the height H1 of the first raised portion to the height H2 of the second raised portion is set to be in a range of 1.92 or more and 2.75 or less.

16 Claims, 21 Drawing Sheets

(51) Int. Cl.
*F02D 41/30* (2006.01)
*F02B 11/00* (2006.01)
*F02B 23/10* (2006.01)
*F02P 15/08* (2006.01)
*F02D 41/00* (2006.01)

(52) U.S. Cl.
CPC ...... *F02B 23/0642* (2013.01); *F02B 23/0678* (2013.01); *F02B 23/101* (2013.01); *F02D 41/3041* (2013.01); *F02D 41/402* (2013.01); *F02B 2023/106* (2013.01); *F02B 2023/108* (2013.01); *F02D 2041/0015* (2013.01); *F02P 15/08* (2013.01)

(58) Field of Classification Search
CPC ................ F02B 23/0678; F02B 23/101; F02B 2023/106; F02B 2023/108; F02B 2075/125; F02B 2275/14; F02B 2275/48; F02F 3/26
See application file for complete search history.

(56) References Cited

U.S. PATENT DOCUMENTS

| | | | | |
|---|---|---|---|---|
| 6,047,592 A * | 4/2000 | Wirth | F02B 23/101 | 73/114.77 |
| 6,129,065 A * | 10/2000 | Ueda | F02B 23/104 | 123/193.6 |
| 6,129,070 A * | 10/2000 | Jingu | F02B 23/0675 | 123/298 |
| 6,152,103 A * | 11/2000 | Kudo | F02F 3/26 | 123/298 |
| 6,269,789 B1 * | 8/2001 | Abe | F02B 23/104 | 123/294 |
| 6,293,246 B1 * | 9/2001 | Tanahashi | F02D 35/023 | 123/305 |
| 6,311,665 B1 * | 11/2001 | Yasuoka | F02B 31/085 | 123/260 |
| 6,325,040 B1 * | 12/2001 | Tanaka | F02F 1/4214 | 123/294 |
| 6,378,486 B1 * | 4/2002 | Spiegel | F02B 23/104 | 123/298 |
| 6,378,490 B1 * | 4/2002 | Ottowitz | F02F 1/4214 | 123/305 |
| 6,460,509 B1 * | 10/2002 | Muramatsu | F02B 23/104 | 123/305 |
| 6,745,745 B2 * | 6/2004 | Huebler | F02B 23/10 | 123/307 |
| 2002/0029758 A1 * | 3/2002 | Baika | F02B 23/104 | 123/298 |
| 2005/0139190 A1 * | 6/2005 | Yu | F02B 23/104 | 123/279 |
| 2010/0175660 A1 * | 7/2010 | Nishimoto | F02B 23/104 | 123/305 |
| 2013/0092116 A1 * | 4/2013 | Teshima | F02B 23/104 | 123/193.4 |
| 2015/0337751 A1 * | 11/2015 | Watanabe | F02D 41/0255 | 701/113 |
| 2016/0281663 A1 * | 9/2016 | Sasaki | F02B 23/104 | |
| 2016/0356229 A1 | 12/2016 | Watanabe et al. | | |
| 2016/0356230 A1 * | 12/2016 | Watanabe | F02D 41/06 | |
| 2017/0009698 A1 * | 1/2017 | Tsugawa | F02B 31/00 | |
| 2017/0082058 A1 * | 3/2017 | Katakura | F02D 41/38 | |
| 2017/0356330 A1 * | 12/2017 | Narahara | F02B 23/101 | |
| 2018/0230896 A1 * | 8/2018 | Ota | F02B 23/10 | |
| 2020/0141306 A1 * | 5/2020 | Imamura | F02F 3/26 | |
| 2020/0158006 A1 * | 5/2020 | Imamura | F02B 23/0621 | |
| 2020/0166003 A1 * | 5/2020 | Imamura | F02D 41/3818 | |

FOREIGN PATENT DOCUMENTS

| | | | | | |
|---|---|---|---|---|---|
| JP | 2000186557 | A | * | 7/2000 | |
| JP | 2002106353 | A | * | 4/2002 | ............... F02F 3/26 |
| JP | 2007100546 | A | * | 4/2007 | ............... F02F 3/26 |
| JP | 2010150969 | A | * | 7/2010 | |
| JP | 2016121564 | A | * | 7/2016 | |
| JP | 2016223411 | A | | 12/2016 | |

* cited by examiner

FIG.8
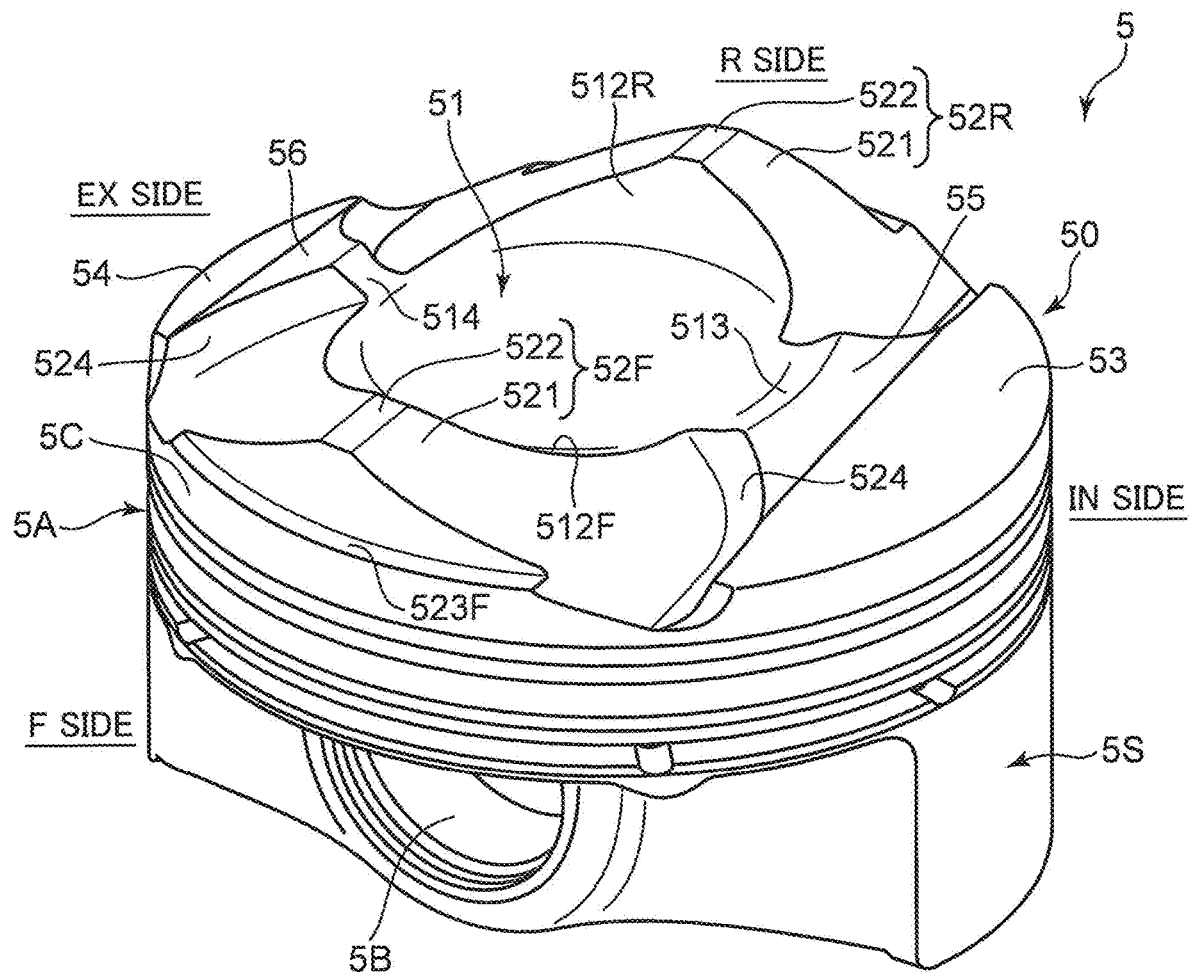
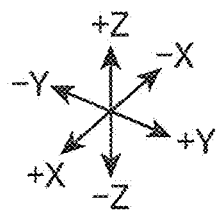

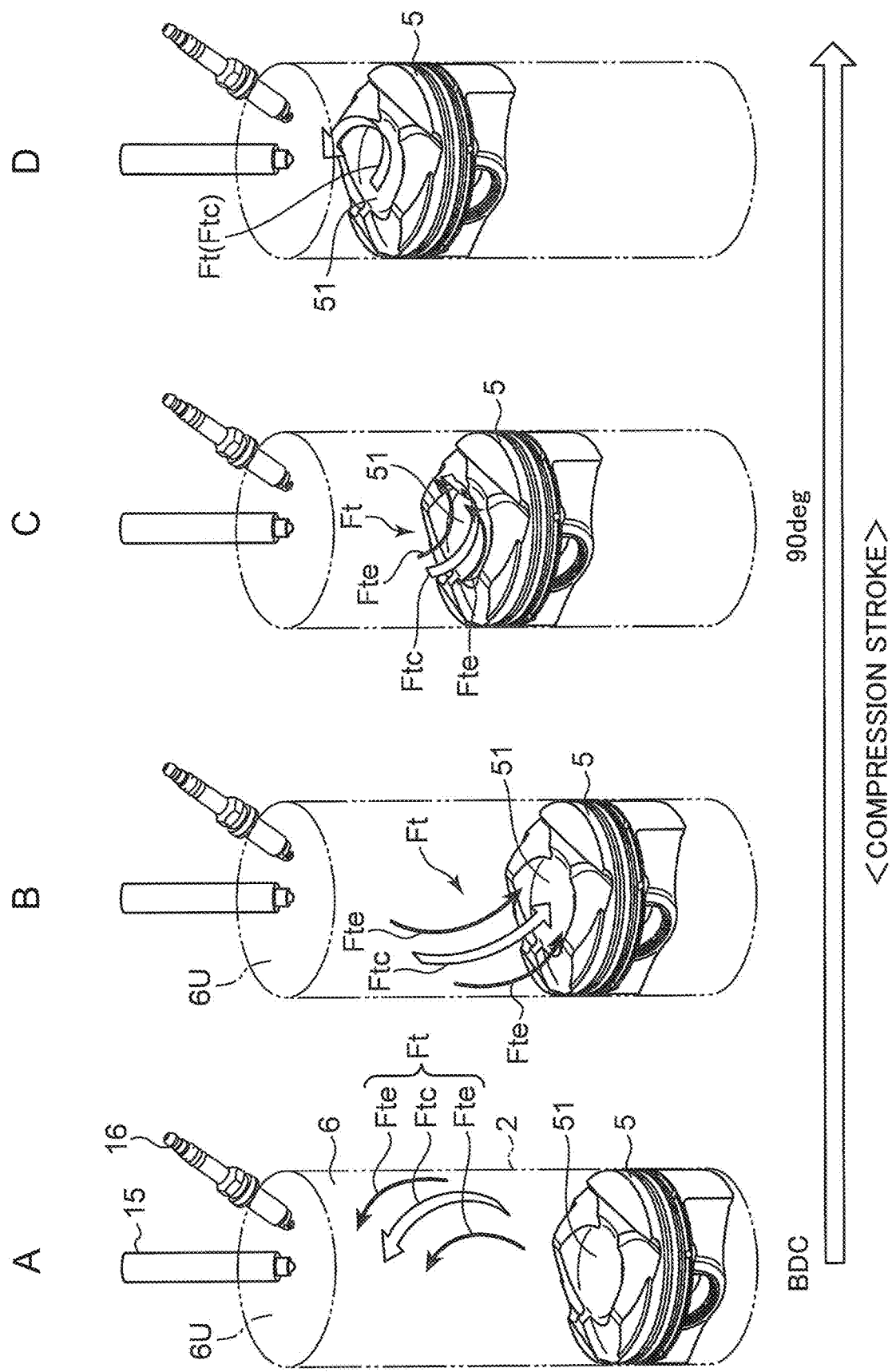

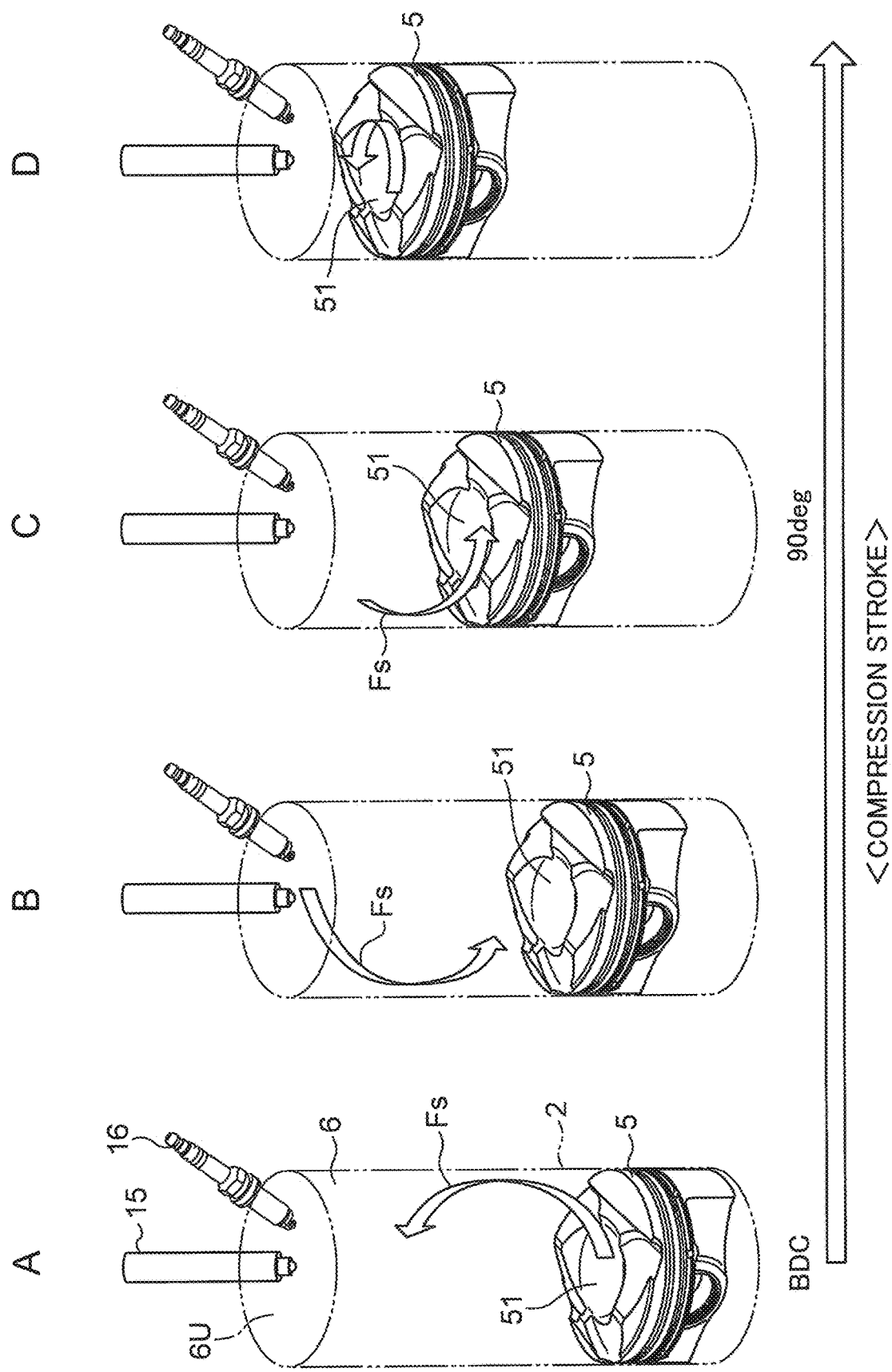

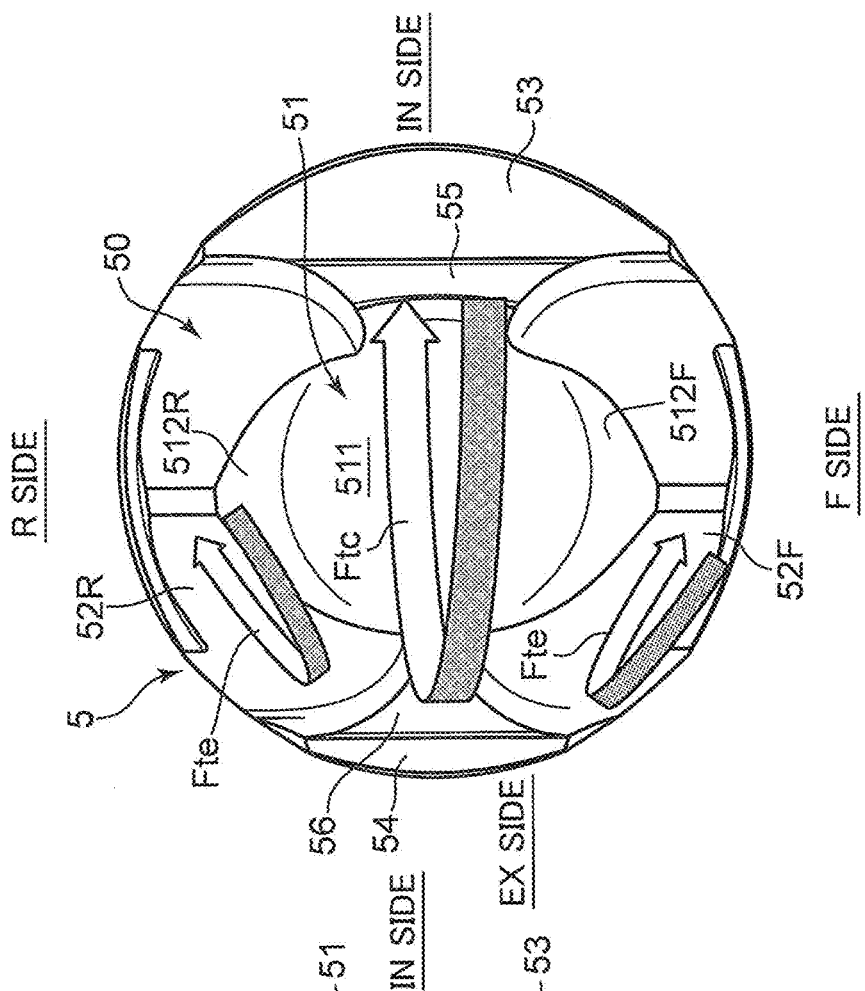
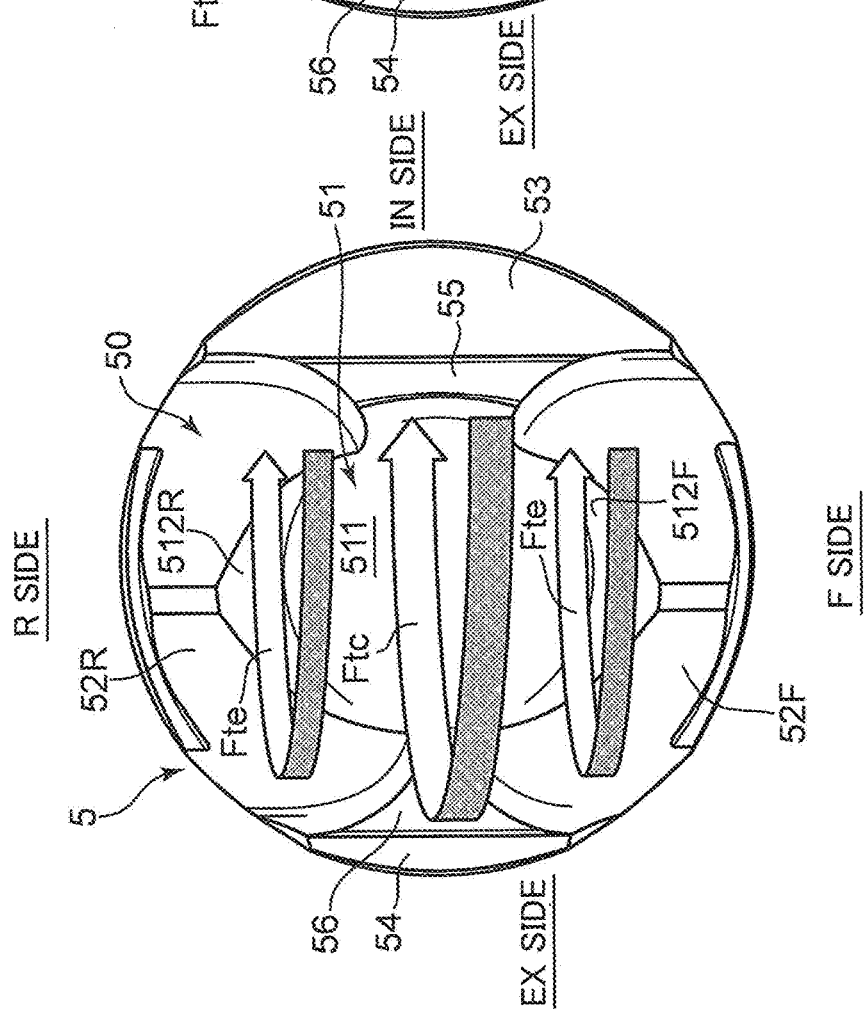

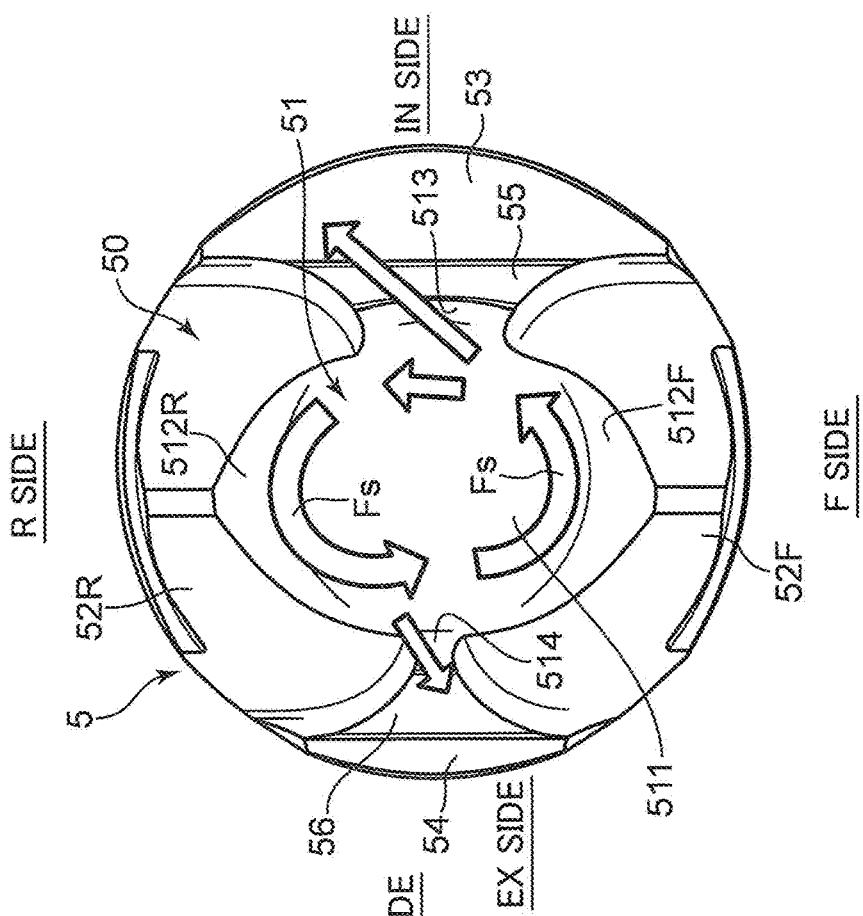
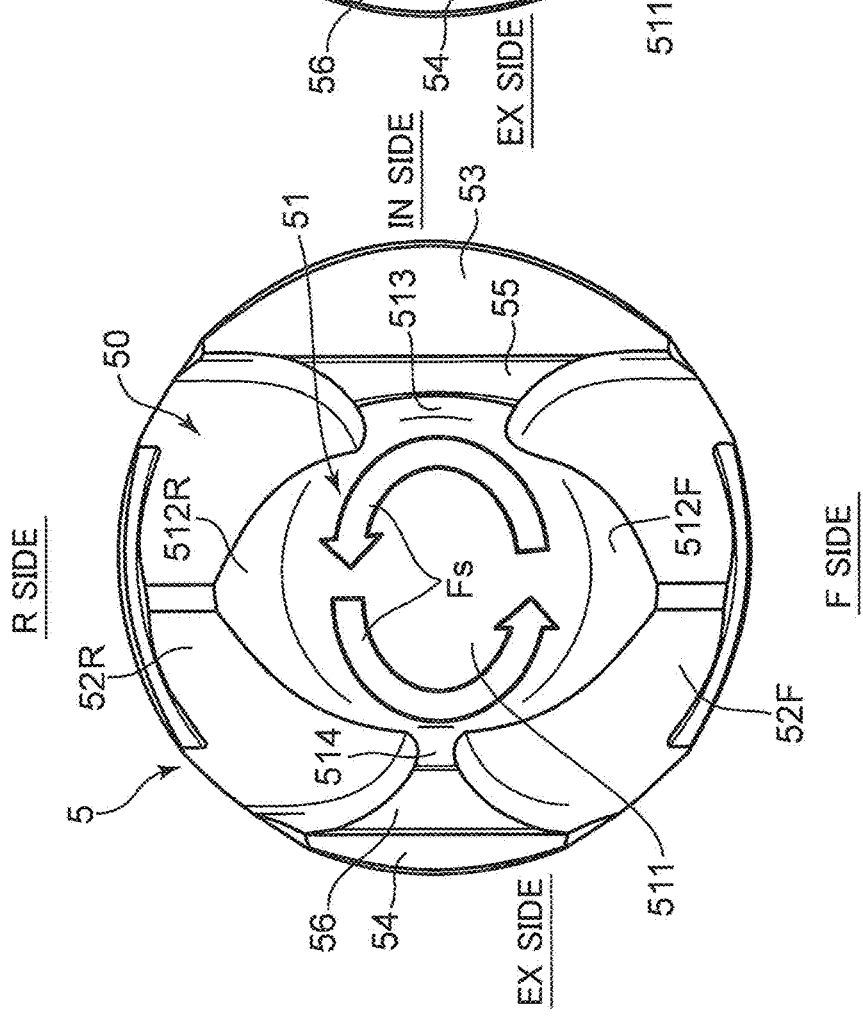

COMBUSTION CHAMBER STRUCTURE FOR ENGINE

TECHNICAL FIELD

The present invention relates to a combustion chamber structure for an engine enabling partial compression ignition combustion in which a part of mixture gas is subjected to SI combustion by spark ignition and the remaining part of the mixture gas is subjected to CI combustion by self-ignition.

BACKGROUND

As a combustion manner of a gasoline engine, partial compression ignition combustion (SPCCI combustion) is known which is intended to forcibly combust a part of mixture gas through flame propagation caused by spark ignition as a trigger (SI combustion) and combust the remaining mixture gas by self-ignition (CI combustion). As a combustion chamber structure for a spark-ignition engine, for example, Japanese Unexamined Patent Publication No. 2016-223411 discloses a structure in which a combustion chamber ceiling surface is designed to have a pent-roof shape and a crown surface of a piston provided with a cavity, the crown surface being a combustion chamber bottom surface. The combustion chamber structure enables a tumble flow to be generated which flows obliquely upward toward a fuel injection valve.

In SPCCI combustion, it is desirable to maintain a swirl flow as much as possible until a later period of a compression stroke to improve combustion properties. However, it is not easy in a high compression ratio engine suitable for SPCCI combustion to maintain a swirl flow until the later period of the compression stroke. In an actual engine, for example, common SI combustion and SPCCI combustion are used in combination according to an engine speed and a load. In the SI combustion, it is desirable to maintain a tumble flow as much as possible until the later period of the compression stroke. However, a conventional combustion chamber structure has a problem that both a tumble flow and a swirl flow cannot be maintained satisfactorily until the later period of the compression stroke.

SUMMARY

An object of the present invention is to provide, in a high compression ratio engine in which SPCCI combustion is conducted, a combustion chamber structure for an engine in which a swirl flow can be maintained until a later period of a compression stroke, and to provide, in an engine using SI combustion and SPCCI combustion in combination, a combustion chamber structure for an engine in which both a tumble flow and a swirl flow can be maintained until the later period of the compression stroke.

A combustion chamber structure for an engine according to one aspect of the present invention includes a combustion chamber defined by a crown surface of a piston, an inner wall surface of a cylinder in which the piston is slidably housed, and a pent roof-shaped ceiling surface. In the combustion chamber, partial compression ignition combustion in which mixture gas combusts by flame propagation and then combusts by compression ignition is performed. The crown surface includes a cavity recessed to have a bowl-shape, a pair of first raised portions having a mound-shape along the pent roof shape of the ceiling surface and provided in an outer circumferential region between the cavity and an outer edge portion of the piston to protrude in a cylinder axis direction, and a second raised portion provided to protrude, in the outer circumferential region, at a position orthogonal to a ridge extending direction of the pair of first raised portions.

With a height of the first raised portion relative to a height position of a deepest portion of the cavity being represented as H1 and a height of the second raised portion being represented as H2, H1/H2 as a ratio of the height H1 of the first raised portion to the height H2 of the second raised portion is set to be in a range of 1.79 or more and 3.29 or less.

In a combustion chamber structure for an engine according to another aspect of the present invention, in the combustion chamber, flame propagation combustion and partial compression ignition combustion are performed in combination, the flame propagation combustion being a mode in which mixture gas combusts by flame propagation, the partial compression ignition combustion being a mode in which mixture gas combusts by flame propagation and then combusts by compression ignition. In this manner, with a height of the first raised portion relative to a height position of a deepest portion of the cavity being represented as H1 and a height of the second raised portion being represented as H2, H1/H2 as a ratio of the height H1 of the first raised portion to the height H2 of the second raised portion is set to be in a range of 1.92 or more and 2.75 or less.

BRIEF DESCRIPTION OF DRAWINGS

FIG. 8 is a perspective view of a piston;

FIG. 14 is a view schematically showing circulation of the tumble flow in a compression stroke;

FIG. 17 is a view schematically showing circulation of the swirl flow in the compression stroke;

FIG. 20A is a schematic view showing the tumble flow in a case where H1/H2 is set to be within an appropriate range, and FIG. 20B is a schematic view showing the tumble flow in a case where H1/H2 is below the appropriate range; and FIG. 21A is a schematic view showing the swirl flow in a case where H1/H2 is set to be within an appropriate range, and FIG. 21B is a schematic view showing the swirl flow in a case where H1/H2 is above the appropriate range.

DETAILED DESCRIPTION

[Overall Configuration of Engine]

Figure 1:
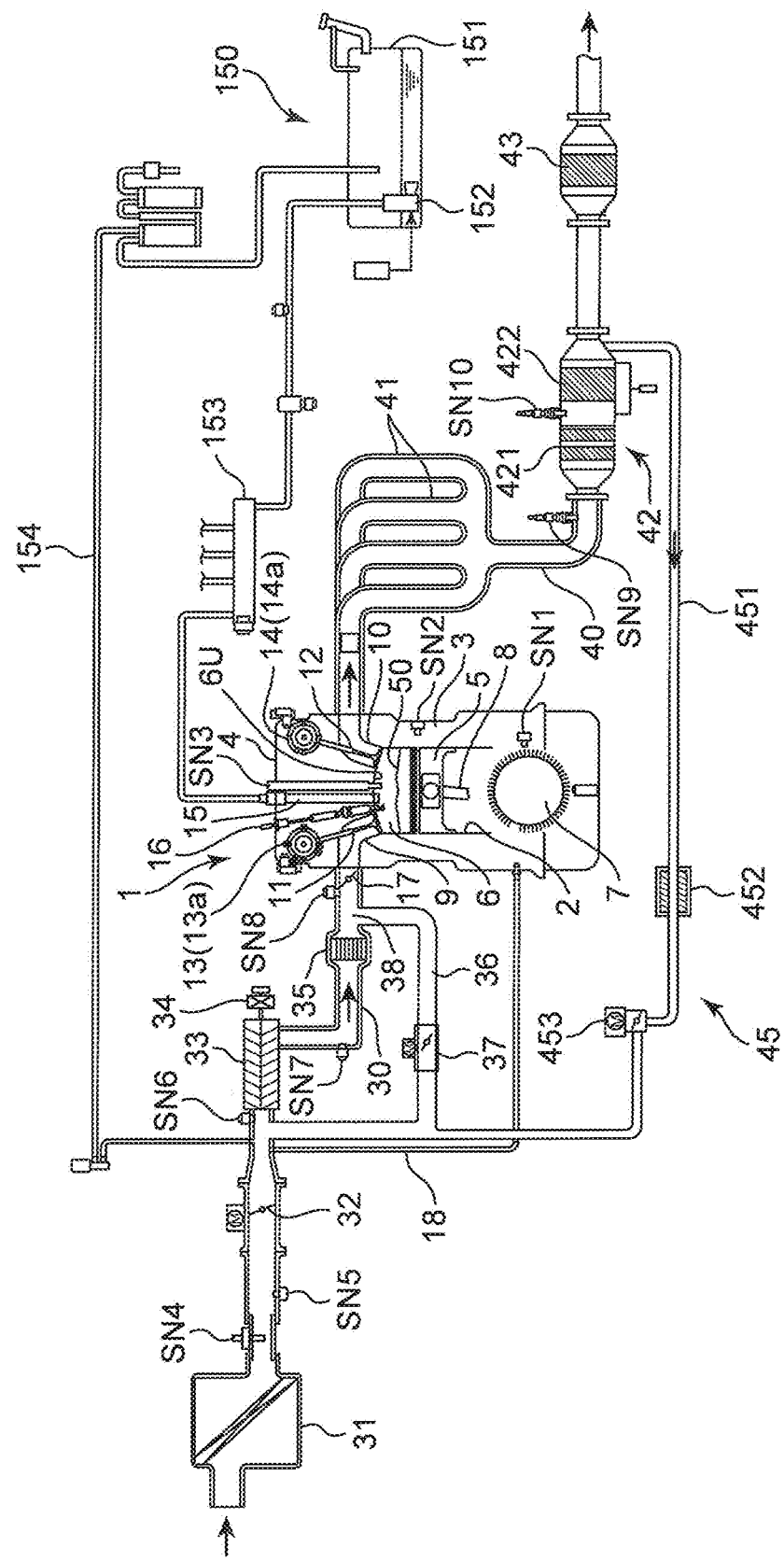
FIG. 1 is a system view showing an overall configuration of a partial compression ignition type engine to which a combustion chamber structure according to the present invention is applied.

In the following, embodiments of the present invention will be described in detail based on the drawings. First, with reference to the system view shown in FIG. 1, description will be made of an overall configuration of a partial compression ignition type engine (hereinafter, referred to simply as an engine) to which a combustion chamber structure according to the present invention is applied. The engine shown in FIG. 1 is a four-stroke gasoline direct injection engine mounted as a power source for running on a vehicle. The engine includes an engine main body 1, an intake passage 30 in which an intake air introduced into the engine main body 1 circulates, an exhaust passage 40 in which exhaust gas discharged from the engine main body 1 circulates, an external EGR device 45 which returns a part of exhaust gas circulating in the exhaust passage 40 to the intake passage 30, and a fuel system 150 which supplies the engine main body 1 with fuel including gasoline as a main component.

Figure 2:
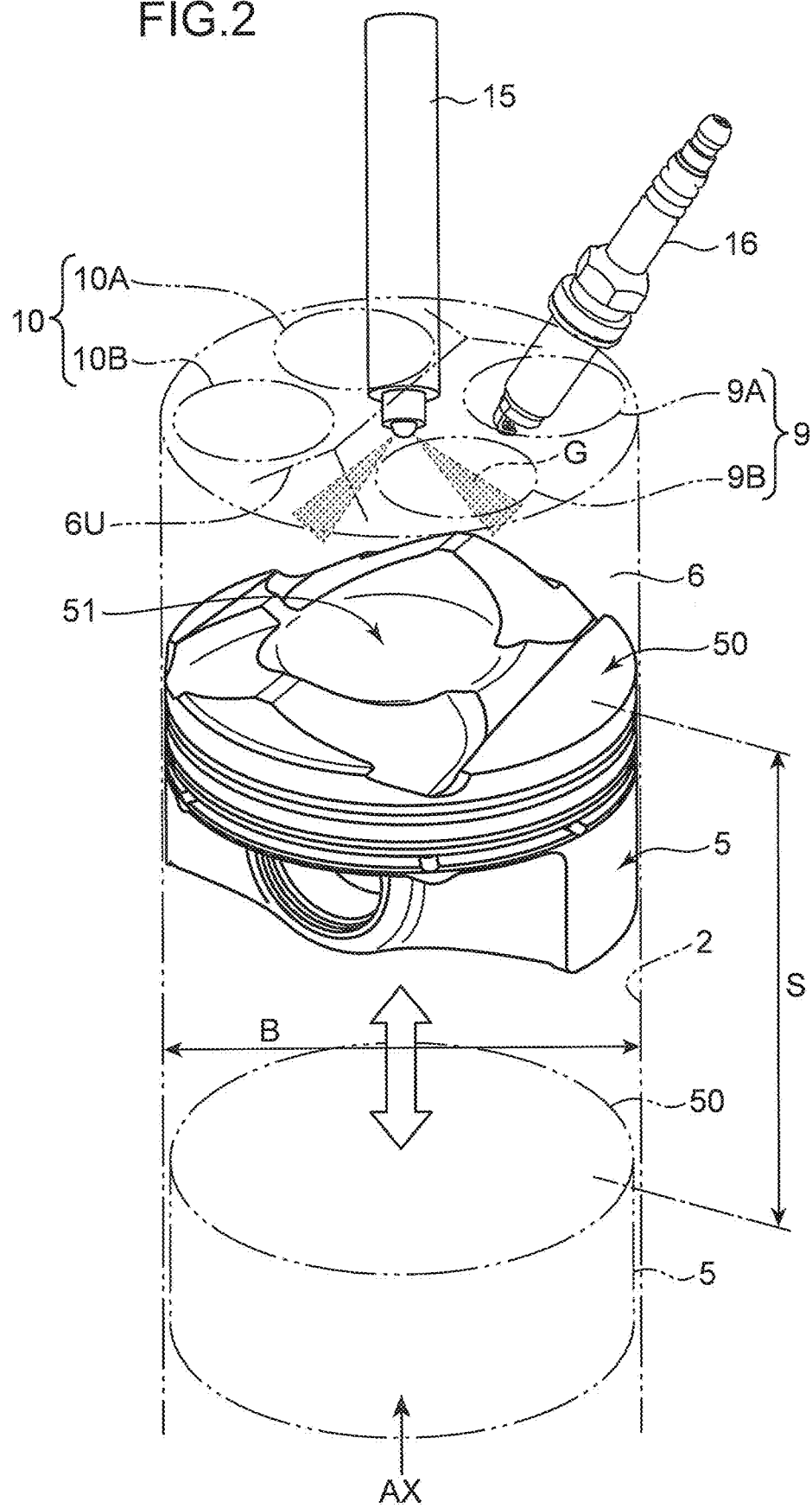
FIG. 2 is a schematic perspective view of one cylinder provided in the engine.

The engine main body 1 has a cylinder block 3 with a cylinder 2 formed therein, a cylinder head 4 attached to an upper surface of the cylinder block 3 so as to close the cylinder 2 from above, and a piston 5 housed in the cylinder 2. Although the engine main body 1 is of multi-cylinder type typically having a plurality of (e.g. four) cylinders, FIG. 1 shows only one cylinder 2 for the purpose of simplification. FIG. 2 is a schematic perspective view of one cylinder 2. The piston 5 has an outer diameter according to a bore diameter B of the cylinder 2 and is housed in the cylinder 2 so as to slidably reciprocate at a predetermined stroke S. Under the piston 5, a crank shaft 7 is provided as an output shaft of the engine main body 1. The crank shaft 7 is joined to the piston 5 via a connecting rod 8 and is driven to rotate around the center axis of the crank shaft 7 according to reciprocation of the piston 5.

Above the piston 5, a combustion chamber 6 is defined. The combustion chamber 6 is supplied with the fuel from an injector 15 by injection. The injector 15 will be described later. The supplied fuel is burnt while being mixed with air in the combustion chamber 6, and the piston 5 pushed down by expansive force due to the combustion reciprocates in an up-down direction. A combustion chamber wall surface zoning the combustion chamber 6 is formed with an inner wall surface of the cylinder 2, a crown surface 50 which is an upper surface of the piston 5, and a combustion chamber ceiling surface 6U (including each valve surface of an intake valve 11 and an exhaust valve 12) which is a bottom surface of the cylinder head 4. The combustion chamber ceiling surface 6U has a pent-roof shape projecting upward.

A geometrical compression ratio of the cylinder 2, i.e. a ratio of a capacity of the combustion chamber 6 when the piston 5 is at a top dead center to a capacity of the combustion chamber 6 when the piston 5 is at a bottom dead center is set to be a high compression ratio of 15 or more and 30 or less, preferably 15 or more and 18 or less, as a suitable value for SPCCI combustion (partial compression ignition combustion) which will be described later. Setting the geometrical compression ratio to be a high compression ratio of 15 or more can bring about an environment where compression ignition is liable to occur in mixture gas in the combustion chamber 6.

In the cylinder block 3, a crank angle sensor SN1 and a water temperature sensor SN2 are installed. The crank angle sensor SN1 detects a rotation angle (a crank angle) of the crank shaft 7 and a rotation speed (an engine rotation speed) of the crank shaft 7. The water temperature sensor SN2 detects temperature of cooling water (engine water temperature) circulating inside the cylinder block 3 and the cylinder head 4.

Figure 3:
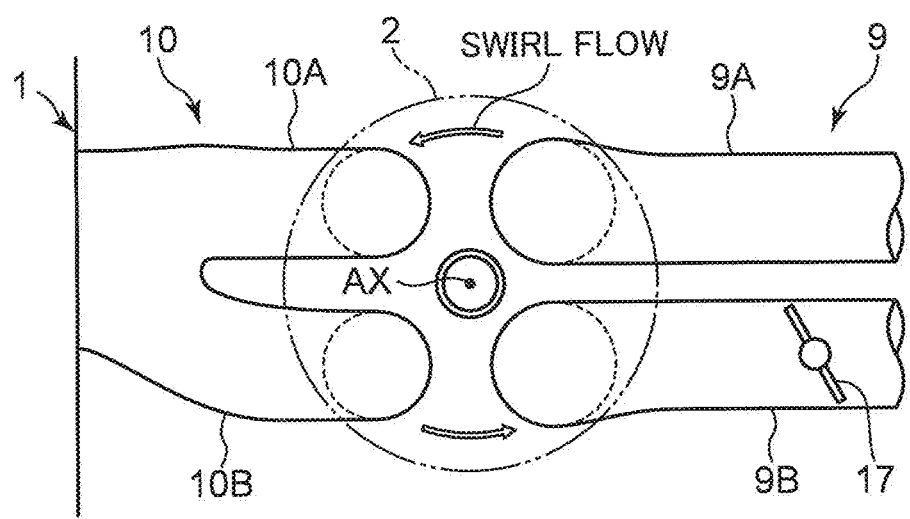
FIG. 3 is a schematic plan view showing a structure of a cylinder and an intake/exhaust system near the cylinder.

The combustion chamber ceiling surface 6U of the cylinder head 4 is provided with an intake port 9 and an exhaust port 10 which are opened toward the combustion chamber 6, the intake valve 11 which opens and closes the intake port 9, and the exhaust valve 12 which opens and closes the exhaust port 10. A valve type of the engine of the present embodiment is four-valve type having intake two valves× exhaust two valves as shown in FIG. 2 and FIG. 3. FIG. 3 is a schematic plan view showing a structure of the cylinder 2 and an intake/exhaust system near the cylinder 2. The intake port 9 has a first intake port 9A and a second intake port 9B, and the exhaust port 10 has a first exhaust port 10A and a second exhaust port 10B. The intake valve 11 is provided one each for the first intake port 9A and the second intake port 9B, and the exhaust valve 12 is provided one each for the first exhaust port 10A and the second exhaust port 10B.

As shown in FIG. 3, of the first and second intake ports 9A and 9B, the second intake port 9B is provided with a swirl valve 17 which is capable of opening and closing the second intake port 9B. When the swirl valve 17 is driven to a closing direction, a ratio of an intake air that flows from the first intake port 9A not provided with the swirl valve 17 into the combustion chamber 6 is increased. Therefore, a circling flow which circles around a cylinder shaft AX (a center axis of the combustion chamber 6), i.e., a swirl flow, can be intensified. Conversely, a swirl flow can be weakened by driving the swirl valve 17 to an opening direction. In the present embodiment, the intake port 9 is a tumble port capable of forming a tumble flow (vertical vortex). Thus, a swirl flow formed when the swirl valve 17 is closed becomes an oblique swirl flow mixed with a tumble flow.

The intake valve 11 and the exhaust valve 12 are driven to be opened and closed in association with rotation of the crank shaft 7 by valve mechanisms 13 and 14 including a pair of cam shafts or the like disposed in the cylinder head 4. The valve mechanism 13 for the intake valve 11 is internally provided with an intake VVT 13a capable of changing opening and closing timing of the intake valve 11 and the valve mechanism 14 for the exhaust valve 12 is internally provided with an exhaust VVT 14a capable of changing opening and closing timing of the exhaust valve 12. The intake and exhaust VVTs 13a and 14a are so-called phase type variable mechanisms which simultaneously change opening timing and closing timing of the intake valve 11 and the exhaust valve 12 by the same amount, respectively.

The injector 15 and an ignition plug 16 are installed in the cylinder head 4. The injector 15 injects fuel supplied from the fuel system 150 to the combustion chamber 6. The ignition plug 16 ignites mixture gas as a mixture of fuel injected from the injector 15 into the combustion chamber 6 and air introduced into the combustion chamber 6 through the intake port 9 (9A, 9B). The cylinder head 4 is further provided with a cylinder internal pressure sensor SN3 which detects a pressure of the combustion chamber 6 (pressure in a cylinder). As shown in FIG. 2, the injector 15 is arranged to have a front end portion (injection hole) exposed at a radial center portion of the combustion chamber ceiling surface 6U, near a top portion of a pent roof. The ignition plug 16 is arranged to have a front end portion (electrode portion) exposed at a slope portion of the pent roof on the combustion chamber ceiling surface 6U, between the pair of intake ports 9A and 9B.

The injector 15 is a multi-injection hole type injector having a plurality of injection holes in its front end portion and is capable of radiately injecting fuel from the plurality of injection holes. In FIG. 2, a region indicated by a sign G represents spray of fuel injected from each injection hole. As will be described later, on the crown surface 50 of the piston 5, a cavity 51 is formed by recessing a radially central region of the crown surface 50 toward a side (lower side) opposite to the cylinder head 4. The front end portion of the injector 15 is opposed to the cavity 51, toward which cavity 51, fuel is injected from the injection hole.

The fuel system 150 which supplies the injector 15 with fuel includes a fuel tank 151, a fuel pump 152, a fuel rail 153, and a purge passage 154. The fuel tank 151 is a tank which stores fuel. The fuel pump 152 is an in-tank type pump and sends fuel from the fuel tank 151 to the fuel rail 153. The fuel rail 153 distributes fuel to the injector 15 provided in each cylinder 2. The purge passage 154 is a passage which collects fuel vaporized in the fuel tank 151 and introduces the vaporized fuel into the intake passage 30 for combustion.

The intake passage 30 is connected to one side surface of the cylinder head 4 so as to communicate with the intake port 9. Air (fresh air) taken in from an upstream end of the intake passage 30 is introduced into the combustion chamber 6 through the intake passage 30 and the intake port 9. The intake passage 30 is provided, sequentially from its upstream side, with an air cleaner 31 which removes foreign matters from intake air, a throttle valve 32 capable of being opened and closed for adjusting a flow rate of intake air, a supercharger 33 which sends out intake air while compressing the air, and an intercooler 35 which cools intake air compressed by the supercharger 33.

The intake passage 30 is provided with, at its appropriate positions, an air flow sensor SN4 which detects a flow rate of intake air, first and second intake temperature sensors SN5 and SN7 which detect temperature of intake air, and first and second intake pressure sensors SN6 and SN8 which detect pressure of intake air. The air flow sensor SN4 and the first intake temperature sensor SN5 are provided at a part between the air cleaner 31 and the throttle valve 32 in the intake passage 30 to detect a flow rate and temperature of intake air passing through the part. The first intake pressure sensor SN6 is provided at a part between the throttle valve 32 and the supercharger 33 in the intake passage 30 and on a downstream side of a connection port of an EGR passage 451 to be described later to detect pressure of intake air passing through the part. The second intake temperature sensor SN7 is provided at a part between the supercharger 33 and the intercooler 35 in the intake passage 30 to detect temperature of intake air passing through the part. The second intake pressure sensor SN8 detects pressure of intake air between the intercooler 35 and the intake port 9 in the intake passage 30.

The supercharger 33 is a mechanical supercharger mechanically in association with the engine main body 1. The supercharger 33 is not limited to a specific type and any of known superchargers such as Lysholm type, root type or centrifugal supercharger can be used as the supercharger 33. An electromagnetic clutch 34 which can be electrically switched between fastening and release is attached on the supercharger 33. When the electromagnetic clutch 34 is fastened, drive force is transmitted from the engine main body 1 to the supercharger 33 and the supercharger 33 conducts supercharging. On the other hand, when the electromagnetic clutch 34 is released, transmission of the above drive force is cut off to stop supercharging by the supercharger 33.

A bypass passage 36 which bypasses the supercharger 33 to cause intake air to circulate is fixed on the intake passage 30. The bypass passage 36 is provided with a bypass valve 37 capable of opening and closing the bypass passage 36. The bypass passage 36 forms a junction portion 38 which branches, on an upstream side of the supercharger 33, from the intake passage 30 and joins, on a downstream side of the intercooler 35, the intake passage 30. The junction portion 38 is also arranged near a surge tank not shown. The bypass passage 36 is a passage which connects the EGR passage 451 to be described later and the surge tank.

The exhaust passage 40 communicates with the exhaust port 10 of each cylinder 2 via an exhaust manifold 41. Already burnt gas which has been generated in each combustion chamber 6 is externally discharged through the exhaust port 10, the exhaust manifold 41, and the exhaust passage 40. In the exhaust passage 40, an upstream catalyst converter 42 and a downstream catalyst converter 43 are provided on an upstream side and a downstream side, respectively, in an exhaust gas circulation direction. The upstream catalyst converter 42 includes a three-way catalyst 421 and a GPF (gasoline particulate filter) 422. The three-way catalyst 421 collects a toxic component (HC, CO, NOx) contained in exhaust gas circulating through the exhaust passage 40. The GPF 422 collects particulate substance which is typically soot contained in exhaust gas. The downstream catalyst converter 43 is a catalyst converter which is internally provided with an appropriate catalyst such as a three-way catalyst, a NOx catalyst, or the like.

At a part on an upstream side of the upstream catalyst converter 42 in the exhaust passage 40, a linear $O_2$ sensor SN9 is arranged which detects a concentration of oxygen contained in exhaust gas. The linear $O_2$ sensor SN9 is a sensor having an output value linearly changed with shade of an oxygen concentration, and based on the output value, an air-fuel ratio of mixture gas can be estimated. A NOx sensor SN10 which measures a NOx concentration in exhaust air is arranged between the three-way catalyst 421 and the GPF 422.

The external EGR device 45 has the EGR passage 451 which connects the exhaust passage 40 and the intake passage 30, and an EGR cooler 452 and an EGR valve 453 which are provided in the EGR passage 451. The EGR passage 451 connects a part downstream of the upstream catalyst converter 42 in the exhaust passage 40 and a part between the throttle valve 32 and the supercharger 33 in the intake passage 30 with each other. By heat exchange, the EGR cooler 452 cools exhaust gas (the external EGR gas) returned from the exhaust passage 40 to the intake passage 30 through the EGR passage 451. The EGR valve 453 is arranged in the EGR passage 451 downstream of the EGR cooler 452 and adjusts a flow rate of exhaust gas circulating through the EGR passage 451.

[Control System]

Figure 4:
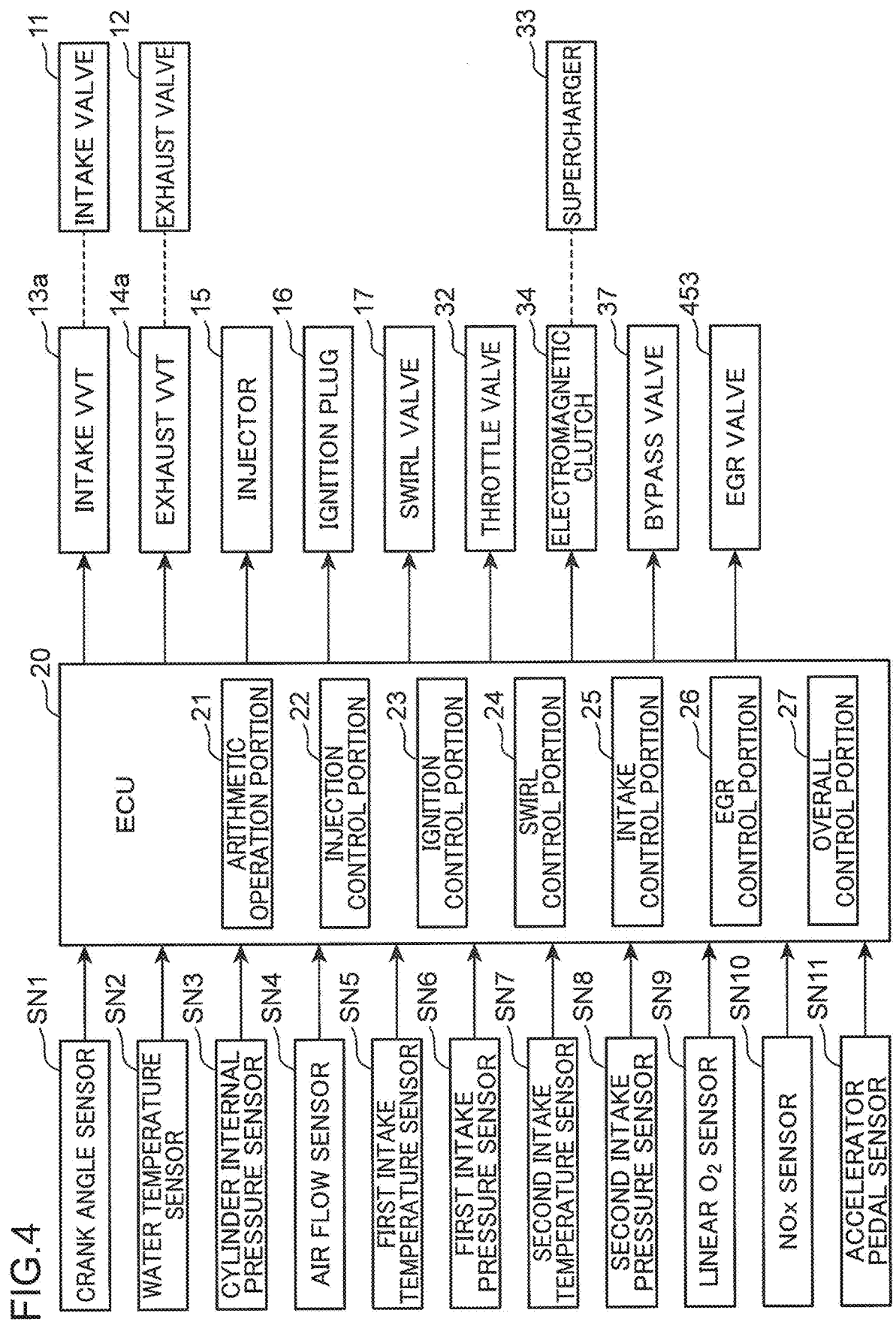
FIG. 4 is a block diagram showing a control system of the engine.

Subsequently, a control system of the above-described engine will be described. FIG. 4 is a block diagram showing the control system of the engine. The control system includes an ECU 20. The ECU 20 is a microprocessor which conducts centralized control of the engine and is configured by a well-known CPU, ROM, RAM, or the like.

The ECU 20 receives input of a detection signal obtained by various sensors. The ECU 20 is electrically connected to the above-described crank angle sensor SN1, water temperature sensor SN2, cylinder internal pressure sensor SN3, air flow sensor SN4, first and second intake temperature sensors SN5 and SN7, first and second intake pressure sensors SN6 and SN8, and linear $O_2$ sensor SN9 and NOx sensor SN10. Information (i.e. crank angle, engine rotation speed, engine water temperature, pressure in a cylinder, intake flow rate, intake temperature, intake pressure, oxygen concentration of exhaust gas, NOx concentration, and the like) detected by these sensors is sequentially input to the ECU 20. The vehicle is also provided with an accelerator pedal sensor SN11 which detects opening of an accelerator pedal not shown. A detection signal obtained by the accelerator pedal sensor SN11 is also input to the ECU 20.

The ECU 20 controls each portion of the engine while executing various determination, arithmetic operation, and the like based on the information input from each of the above sensors. Specifically, the ECU 20 is electrically connected to the intake VVT 13a, the exhaust VVT 14a, the injector 15, the ignition plug 16, the swirl valve 17, the throttle valve 32, the electromagnetic clutch 34, the bypass valve 37, the EGR valve 453, and the like to output a signal for control to these apparatuses based on a result of the above arithmetic operation or the like.

As a result of execution of a predetermined program, the ECU 20 operates to functionally include an arithmetic operation portion 21, an injection control portion 22, an ignition control portion 23, a swirl control portion 24, an intake control portion 25, an EGR control portion 26, and an overall control portion 27.

The injection control portion 22 is a control module which controls fuel injection operation by the injector 15. The ignition control portion 23 is a control module which controls ignition operation by the ignition plug 16. The swirl control portion 24 is a control module which controls opening of the swirl valve 17. The intake control portion 25, which is a control module that adjusts a flow rate and a pressure of intake air to be introduced into the combustion chamber 6, controls each opening of the throttle valve 32 and the bypass valve 37 and ON/OFF of the electromagnetic clutch 34. The EGR control portion 26, which is a control module that adjusts an amount of EGR gas to be introduced into the combustion chamber 6, controls each operation of the intake VVT 13a and the exhaust VVT 14a and opening of the EGR valve 453.

The arithmetic operation portion 21 is a control module which executes various arithmetic operation for the determination of control target values for the above respective control portions 22 to 26 and determination of an operation state of the engine. The overall control portion 27 conducts centralized control of the arithmetic operation portion 21 and the respective control portions 22 to 26 according to an engine operation scene to cause necessary arithmetic operation and control to be executed.

[Control According to Operation State]

Figure 5:
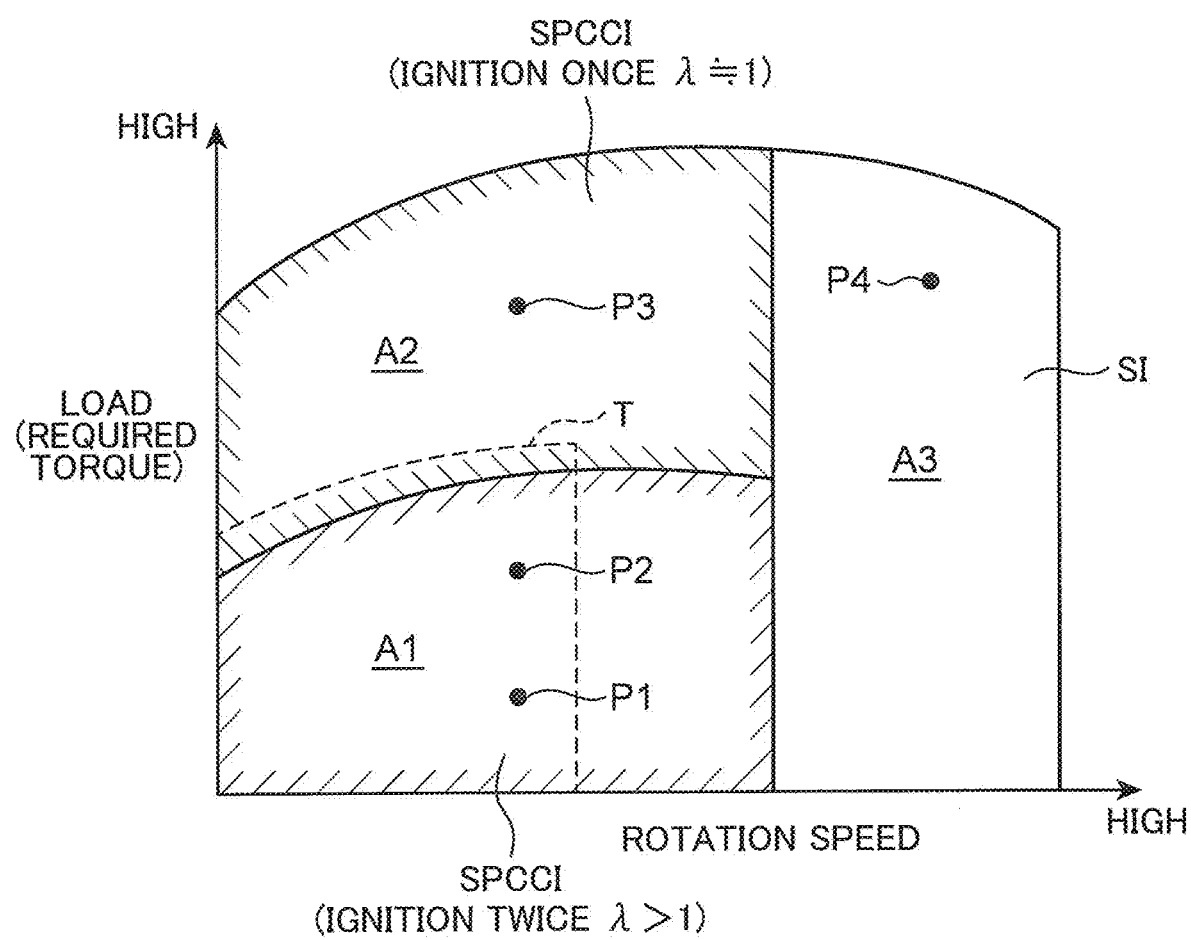
FIG. 5 is an operation map obtained by dividing operation regions of the engine by a difference in a combustion mode.

FIG. 5 is an operation map for use when the engine is warm in the present embodiment, which map shows a difference in control according to a rotation speed/load of the engine. In the following description, a heavy (light) load of the engine is equivalent to a high (low) required torque of the engine.

An operation region of the engine when the engine is warm is roughly divided into three operation regions A1 to A3 depending on a difference in a combustion mode. These operation regions A1 to A3 will be referred to as a first operation region A1, a second operation region A2, and a third operation region A3. The third operation region A3 is a high speed region with a high rotation speed. The first operation region A1 is a low and middle speed/light load region obtained by excluding, from a region of a lower speed than the third operation region A3, a part of a heavy load region. The second operation region A2 is a remaining region other than the first and third operation regions A1 and A3, i.e., a low and middle speed/heavy load region. Hereinafter, combustion modes selected in the respective operation regions, and the like will be described.

<First Operation Region>

In the first operation region A1 of low and middle speed/light load, partial compression ignition combustion (hereinafter, referred to as SPCCI combustion) is executed which combines SI combustion and CI combustion. The SI combustion is a combustion mode in which mixture gas is ignited by spark generated from the ignition plug 16 and the mixture gas is forcibly combusted through flame propagation of expanding a combustion region from the ignition point toward its surroundings. The CI combustion is a combustion mode in which mixture gas is combusted by self-ignition under a high temperature and high pressure environment caused by compression of the piston 5. The SPCCI combustion as a combination of these SI combustion and CI combustion is a combustion mode in which a part of mixture gas in the combustion chamber 6 is subjected to the SI combustion by spark ignition which is conducted under an environment immediately before the mixture gas has self-ignition, and after the SI combustion (due to further higher temperature and higher pressure following the SI combustion), the remaining mixture gas in the combustion chamber 6 is subjected to the CI combustion by self-ignition. "SPCCI" is an abbreviation of "Spark Controlled Compression Ignition".

Figure 7:
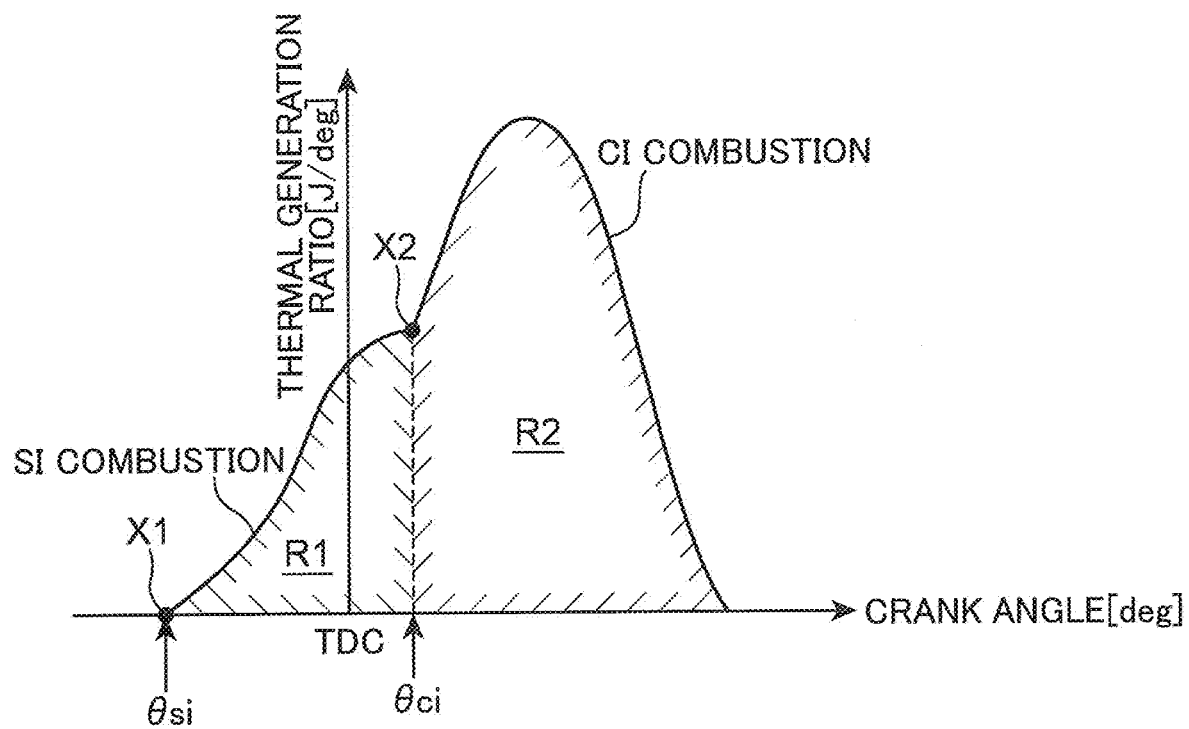
FIG. 7 is a graph showing a waveform of a thermal generation ratio during SPCCI combustion (partial compression ignition combustion)

SPCCI combustion has a property of having more abrupt heat generation in CI combustion than heat generation in SI combustion. FIG. 7 is a graph showing a waveform of a thermal generation ratio during SPCCI combustion. A point X1 of the waveform represents a heat generation point (the crank angle θsi) at which a thermal generation ratio is raised as the SI combustion starts. After the heat generation point, an inclination of a combustion initial rise corresponding to the SI combustion is smaller than an inclination of a rise caused corresponding to the subsequent CI combustion. Specifically, a waveform of the thermal generation ratio during the SPCCI combustion is formed with a first thermal generation ratio part R1 and a second thermal generation ratio part R2 in succession in that order, the first thermal generation ratio part R1 having a relatively small inclination of a rise based on the SI combustion and the second thermal generation ratio part R2 having a relatively large inclination based on the CI combustion. Corresponding to such tendency of the thermal generation ratio, the SPCCI combustion has a lower pressure increase rate (dp/dθ) in the combustion chamber 6 which is caused during the SI combustion than that caused during the CI combustion.

When the temperature and the pressure in the combustion chamber 6 are increased by the SI combustion, mixture gas yet to be burned is responsively ignited by itself to start the CI combustion. At the timing of start of the CI combustion, an inclination of the waveform of the thermal generation ratio changes from small to large. Specifically, the waveform of a thermal generation ratio in the SPCCI combustion has a point of inflection (a point X2=the crank angle θci in FIG. 7) appearing at the timing of start of the CI combustion.

After the start of the CI combustion, the SI combustion and the CI combustion are conducted in parallel to each other. Since the CI combustion has a higher mixture gas combustion speed than in the SI combustion, the thermal generation ratio becomes relatively high. Since the CI combustion is conducted after a compression top dead center, an inclination of the waveform of the thermal generation ratio will never become excessive. Specifically, since after passing the compression top dead center, a motoring pressure is reduced due to descending of the piston 5 to result in suppressing an increase in the thermal generation ratio, thereby preventing dp/dθ during the CI combustion from becoming excessive. Because in the SPCCI combustion, the CI combustion is conducted after the SI combustion in this manner, dp/dθ as an index of combustion noise hardly becomes excessive. It is therefore possible to suppress combustion noise more than in simple CI combustion (in a case where all the fuels are subjected to CI combustion).

End of the CI combustion is followed by end of the SPCCI combustion. Since the CI combustion has a combustion speed faster than in the SI combustion, combustion end timing can be advanced as compared with timing in simple SI combustion (all the fuels are subjected to SI combustion). In other words, in the SPCCI combustion, the combustion end timing can be drawn near to the compression top dead center within an expansion stroke. This enables more improvement in fuel consumption performance in the SPCCI combustion than in simple SI combustion. At the execution of the SPCCI combustion in the first operation region A1, the overall control portion 27 of the ECU 20 causes each of the control portions 22 to 26 to execute the following control.

Regarding spark ignition, the overall control portion 27 executes control for causing the ignition plug 16 to generate spark twice and causing mixture gas to be subjected to SPCCI combustion with second spark ignition as a trigger. Specifically, the ignition plug 16 (the ignition control portion 23) executes preceding ignition which causes generation of spark at timing sufficiently advanced from the compression top dead center, and a main ignition which causes generation of spark at timing closer to the compression top dead center than the preceding ignition. The preceding ignition is executed in either an early period or a middle period of a compression stroke (BTDC 180 to 60° CA). The main ignition is ignition which starts the SI combustion and which is executed in a period from a later period of the compression stroke to an early period of the expansion stroke (BTDC 60 to ATDC 60° CA). After fuel injection, the preceding ignition may be executed in the intake stroke.

Figure 6:
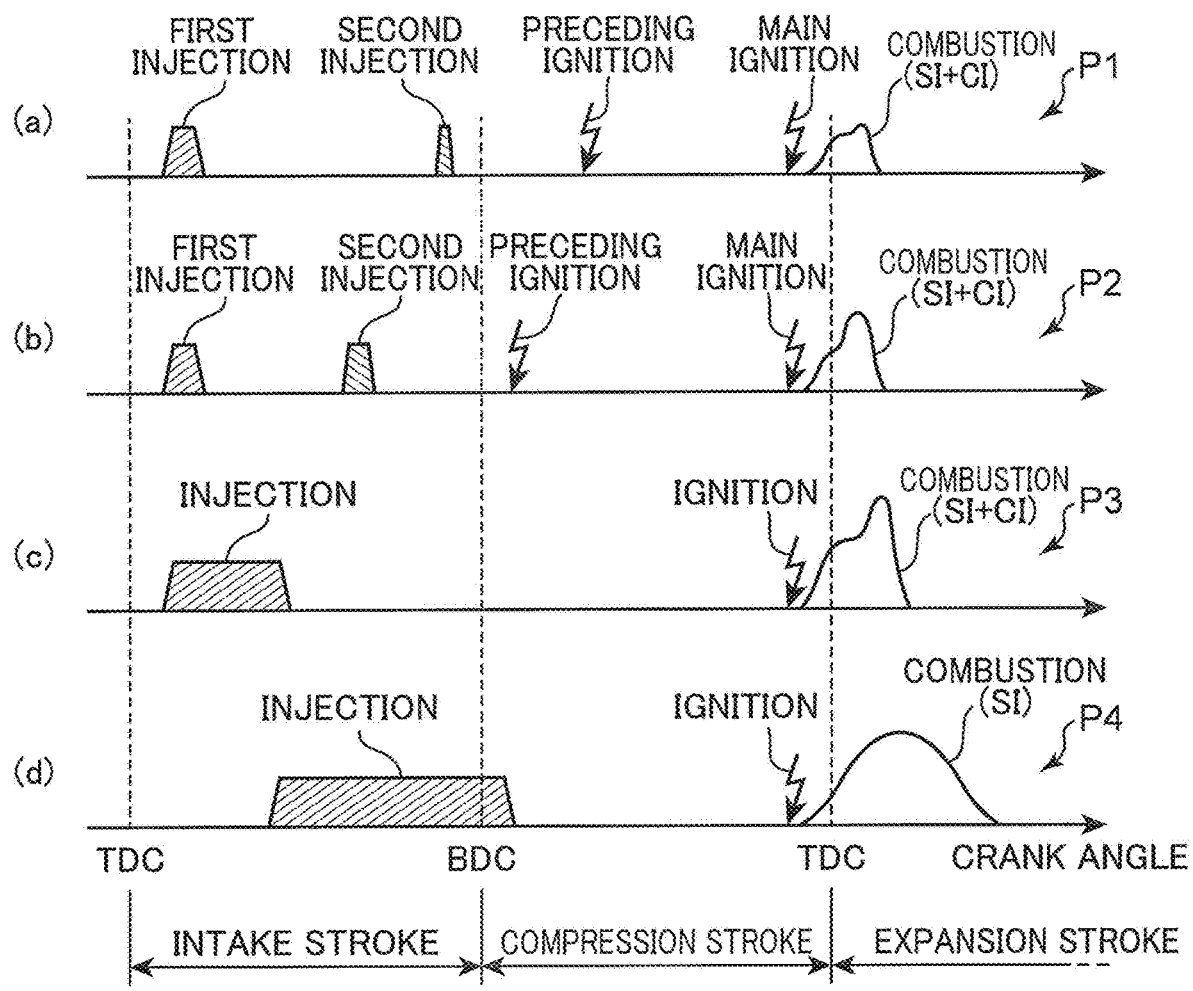
FIG. 6 is a time chart for schematically explaining combustion control to be conducted in each operation region of the engine.

FIG. 6 is a time chart for schematically explaining combustion control to be conducted in each operation region of the engine. At the operation points P1 and P2 on a light-load side in the first operation region A1, the ignition control portion 23 controls the ignition plug 16 to execute the preceding ignition in the early period of the compression stroke and also execute the main ignition in the later period of the compression stroke as shown in each of the charts (a) and (b) of FIG. 6. Timing of the preceding ignition at the operation point P2 on a heavy-load side is set at a side advanced from the timing of the preceding ignition at the operation point P1 on the light-load side. This is in association with timing of second injection to be described later (last fuel injection in one cycle). Specifically, the ignition control portion 23 advances the timing of the preceding ignition more on the heavy-load side in association with the timing of the second injection such that a crank angle period from end timing of the second injection to the preceding ignition is maintained to be generally constant. The injection control portion 22 changes the timing of the second injection according to an engine load (operation state) and the ignition control portion 23 changes the timing of the preceding ignition before and after the change of the timing of the second injection such that a period from the end timing of the second injection to the timing of the preceding ignition is maintained to be generally constant.

The preceding ignition executed at timing sufficiently advanced from the compression top dead center causes no generation of flame propagation of mixture gas. The preceding ignition is conducted aiming at increasing mixture gas around spark (arc) to a target temperature of 850 K or more and less than 1140 K to cleave a fuel component (hydrocarbon) and produce an intermediate product containing an OH radical. Also for reliably preventing generation of flame propagation, energy of the preceding ignition is made smaller than energy of the main ignition. Accordingly, even when such preceding ignition is conducted, mixture gas will have substantially no frame formed, so that the SI combustion will not be started.

On the other hand, the main ignition with large energy which is executed at timing relatively close to the compression top dead center causes generation of flame propagation of mixture gas to cause the SI combustion. When the SI combustion is started, the combustion chamber 6 is brought into a high temperature and high pressure state, which brings about the CI combustion. Specifically, the SPCCI combustion is started with the main ignition as a trigger, a part of the mixture gas in the combustion chamber 6 is combusted through flame propagation (SI combustion) and the remaining mixture gas is combusted by self-ignition (CI combustion).

The injector 15 divisionally injects fuel twice during the intake stroke, the fuel being to be injected in one cycle. In the first operation region A1, the injection control portion 22 controls the injector 15 to divisionally inject fuel twice as first injection and the second injection in a predetermined period earlier than the above-described preceding ignition. At the operation points P1 and P2, the injector 15 starts the first injection in a first half of the intake stroke and also starts the second injection in a latter half of the intake stroke as shown in the charts (a) and (b) of FIG. 6. Start timing of the second injection at the operation point P2 on the heavy-load side is set to be on an advanced side than start timing of the second injection at the operation point P1 on the light-load side.

The timing of the second injection is advanced more as the load in the first operation region A1 is increased. A total amount of fuel injected from the injector 15 by divisional injection is set to be larger on the heavy-load side on which a required torque is increased. Additionally, a division ratio of the first and second injections is set to have a smaller ratio of the first injection toward the heavy-load side (an amount of injection: the first injection>the second injection). For example, the division ratio of the first and second injections is set to change roughly from 9:1 to 6:4 from the light-load side toward the heavy-load side in the first operation region A1. This prevents reduction in emission performance due to excessive stratification of fuel.

During operation in the first operation region A1, the opening of the throttle valve 32 is set to be opening which allows more air than an amount of air equivalent to a theoretical air-fuel ratio to be introduced into the combustion chamber 6 through the intake passage 30. Specifically, the intake control portion 25 sets the opening of the throttle valve 32 to be relatively large (A/F lean) such that an air-fuel ratio (A/F) as a weight ratio of air (fresh air) introduced into the combustion chamber 6 through the intake passage 30 to fuel injected to the combustion chamber 6 by the above first and second injections becomes larger than the theoretical air-fuel ratio (14.7). As a result, more air than the amount of air equivalent to the theoretical air-fuel ratio is introduced into the combustion chamber 6 through the intake passage 30.

In a region on an inner side (on a low speed side of the first operation region A1) of a supercharging line T shown in FIG. 5, the overall control portion 27 brings the supercharger 33 into an OFF state and in a region on an outer side (on a high speed side of the first operation region A1) of the supercharging line T, into an ON state. On the low speed side of the first operation region A1, the electromagnetic clutch 34 is released to release joining between the supercharger 33 and the engine main body 1, while the bypass valve 37 is fully opened to stop supercharging by the supercharger 33. On the other hand, on the high speed side of the first operation region A1, the electromagnetic clutch 34 is fastened to join the supercharger 33 and the engine main body 1, so that the supercharger 33 conducts supercharging. At this time, the intake control portion 25 controls opening of the bypass valve 37 such that a supercharging pressure detected by the second intake pressure sensor SN8 coincides with a target pressure predetermined for each engine operation condition (conditions such as rotation speed, load, and the like).

The EGR control portion 26 opens the EGR valve 453 in many of regions within the first operation region A1 so as to realize an in-cylinder temperature appropriate for the SPCCI combustion. Specifically, the EGR valve 453 is opened so as to realize external EGR which returns exhaust gas to the combustion chamber 6 through the EGR passage 451. The opening of the EGR valve 453 is adjusted to realize the in-cylinder temperature appropriate for obtaining a desired waveform of the SPCCI combustion.

The swirl control portion 24 sets the opening of the swirl valve 17 to be a value smaller than that of a semi-open value (50%). Reduction in the opening of the swirl valve 17 results in making most part of intake air introduced into the combustion chamber 6 be intake air from the first intake port 9A (FIG. 3) to form a strong swirl flow in the combustion chamber 6. The swirl flow grows during the intake stroke to remain until the middle of the compression stroke to accelerate stratification of the fuel. In other words, a concentration difference is formed in which the radial center portion of the combustion chamber 6 has a fuel concentration higher than its outer side region (outer circumferential portion).

<Second Operation Region>

In the low and middle speed/heavy load second operation region A2, control is executed such that mixture gas is subjected to SPCCI combustion by one-time spark ignition. In other words, in the second operation region A2, only the main ignition is executed while omitting the preceding ignition in the above-described first operation region A1. For realizing such SPCCI combustion by one-time ignition, in the second operation region A2, each portion of the engine is controlled in the following manner by the overall control portion 27 of the ECU 20.

The ignition plug 16 executes the spark ignition once in a period from the later period of the compression stroke to the early period of the expansion stroke. At an operation point P3 included in the second operation region A2, the ignition plug 16 executes the spark ignition once in the later period of the compression stroke as shown in the chart (c) of FIG. 6. The SPCCI combustion is started with the spark ignition as a trigger, so that a part of mixture gas in the combustion chamber 6 is combusted through flame propagation (SI combustion) and the remaining mixture gas is combusted by self-ignition (CI combustion). At the operation point P3, the injector 15 executes, during the intake stroke, fuel injection once for supplying the entire amount of fuel to be injected during one cycle as shown in the chart (c) of FIG. 6.

The opening of the throttle valve 32 is set to be opening which allows an amount of air equivalent to a theoretical air-fuel ratio to be introduced into the combustion chamber 6 through the intake passage 30. Specifically, the opening is set to a value ($\lambda \approx 1$) by which an air-fuel ratio (A/F) as a weight ratio of air (fresh air) to fuel in the combustion chamber 6 generally coincides with the theoretical air-fuel ratio (14.7). The supercharger 33 is brought into the OFF state in a part of a light load and low speed side which overlaps the inner side region with respect to the supercharging line T and is brought into the ON state in other regions. The EGR valve 453 is opened up to appropriate opening so as to introduce, into the combustion chamber 6, an amount of the external EGR gas appropriate for the SPCCI combustion in the second operation region A2. The opening of the swirl valve 17 is set to be a value on the order of the opening in the first operation region A1 or to predetermined intermediate opening larger than the value.

<Third Operation Region>

In the third operation region A3 on a side with higher speed than the above first and second operation regions A1 and A2, the SI combustion is executed. For realizing the SI combustion, the overall control portion 27 controls each portion of the engine in the following manner in the third operation region A3.

The ignition plug 16 executes the spark ignition once during a period from the later period of the compression stroke to the early period of the expansion stroke. For example, at an operation point P4 included in the third operation region A3, the ignition plug 16 executes the spark ignition once in the later period of the compression stroke as shown in the chart (d) of FIG. 6. Then, the SI combustion is started with the spark ignition as a trigger, so that all the mixture gas in the combustion chamber 6 is combusted through flame propagation.

The injector 15 injects fuel during a series of period from the intake stroke to the compression stroke. At the operation point P4, which requires considerably high speed and heavy load as conditions, an amount of fuel to be injected during one cycle is large from the beginning and the crank angle period is elongated which is necessary for injecting a required amount of fuel. This is a reason why a fuel injection period at the operation point P4 is longer than any of the periods at the already described other operation points (P1 to P3).

The supercharger 33 is brought into the ON state to execute supercharging. The supercharging pressure at this time is adjusted by the bypass valve 37. The throttle valve 32 and the EGR valve 453 have their openings controlled such that the air-fuel ratio (A/F) in the combustion chamber 6 becomes the theoretical air-fuel ratio or a value ($\lambda \leq 1$) a little richer than the same. The swirl valve 17 is fully opened. As a result, not only the first intake port 9A but also the second intake port 9B is fully opened to increase filling efficiency of the engine.

[Desirable in-Cylinder Circulation in Each Combustion Manner]

In the combustion chamber 6 of the present embodiment, at least a tumble flow and a swirl flow are generated as in-cylinder circulation. Specifically, as described above, the intake port 9 (9A, 9B) of the present embodiment is a tumble port capable of forming the tumble flow. The swirl flow can be formed by opening and closing the swirl valve 17. The engine of the present embodiment uses the SI combustion and the SPCCI combustion in combination, in which the tumble flow is essential in the former combustion manner and the swirl flow is essential in the latter combustion manner.

In the SI combustion, which is combustion mainly conducted in a high rotation and heavy load region, increase in thermal efficiency is demanded. For increasing thermal efficiency, it is desirable to maintain the tumble flow from the intake stroke to the later period of the compression stroke (near the compression top dead center) and convert the maintained tumble flow into a turbulent flow near the compression top dead center at once. Maintaining the tumble flow as much as possible enables speed-up of the flame propagation of the SI combustion to increase thermal efficiency.

On the other hand, in the SPCCI combustion, it is demanded to carry frame (kindling) near the ignition plug 16 generated by the SI combustion at a preceding stage to a region on a circumferential edge of the combustion chamber 6 quickly. It is mostly the swirl flow that contributes to carriage of kindling to the circumferential edge region. Accordingly, it is desirable to maintain the swirl flow from the intake stroke to the vicinity of the compression top dead center. Due to a kindling carrying effect by the swirl flow, the in-cylinder temperature is increased, so that compression ignition in the CI combustion at the later stage can be accelerated. In view of the foregoing points, in the engine according to the present embodiment which uses the SI combustion and the SPCCI combustion in combination, it is desirable to maintain the tumble flow and the swirl flow from the intake stroke to the vicinity of the compression top dead center unlike ordinary gasoline engine and diesel engine.

[Detailed Structure of Piston]

Figure 9:
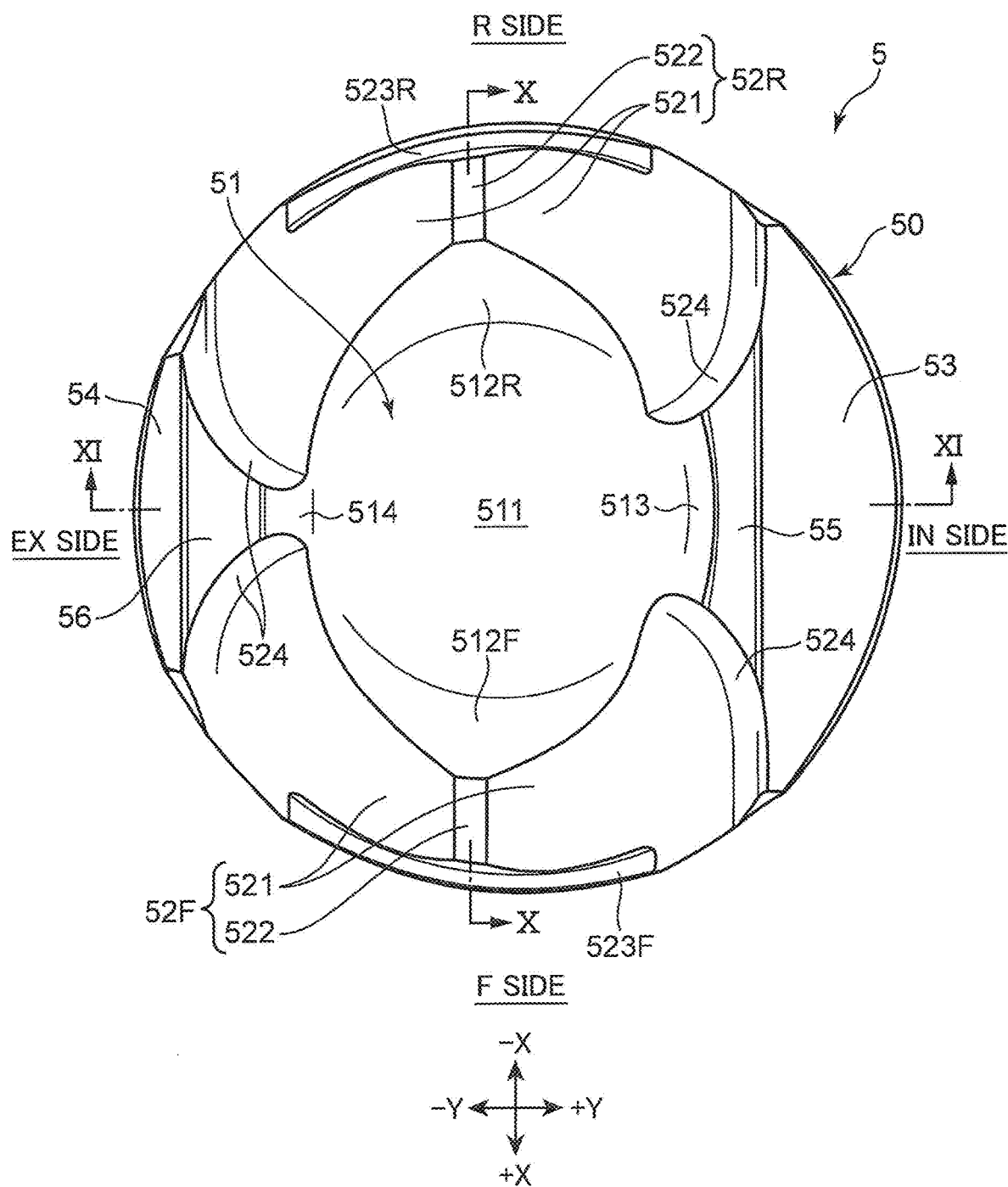
FIG. 9 is a plan view of a crown surface of the piston.
Figure 10:
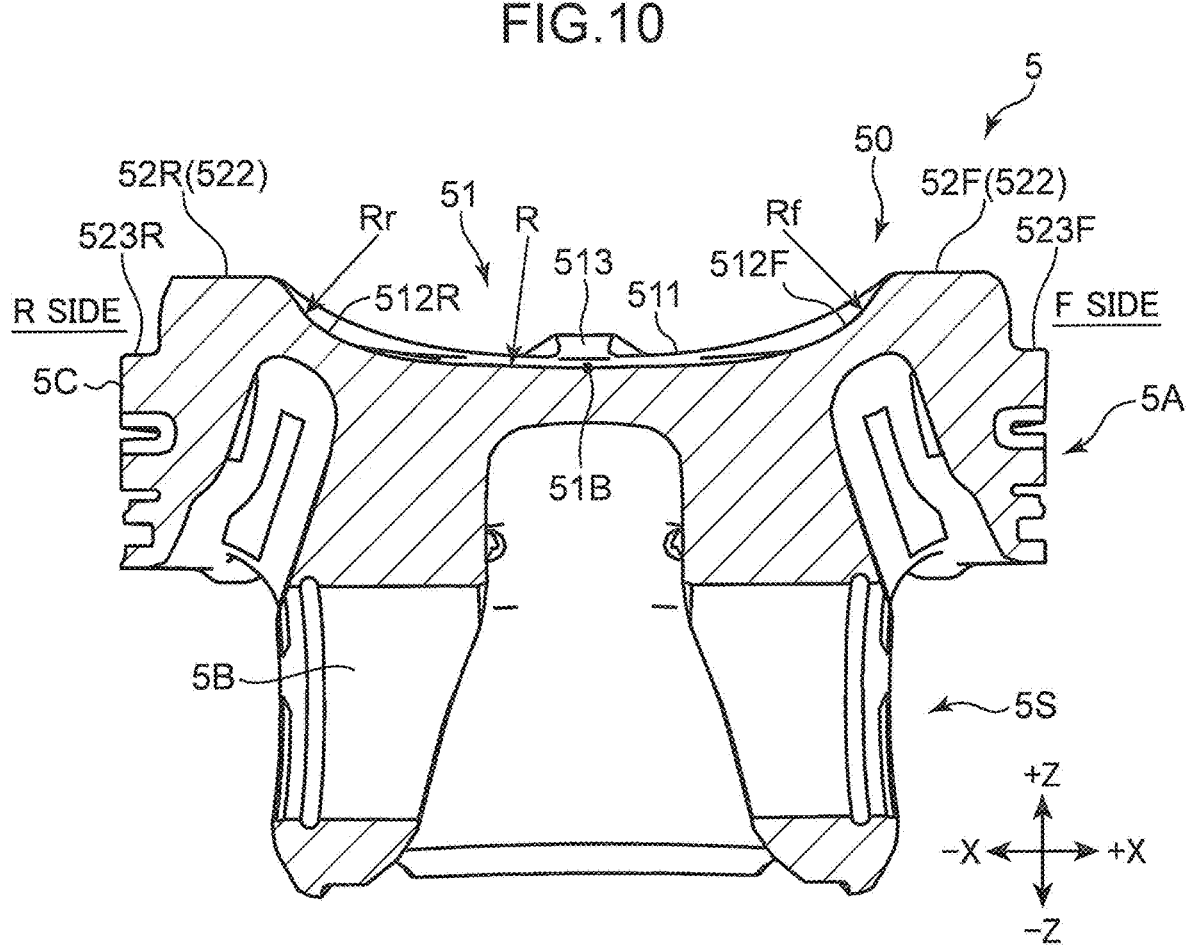
FIG. 10 is a sectional view taken along line X-X in FIG. 9.
Figure 11:
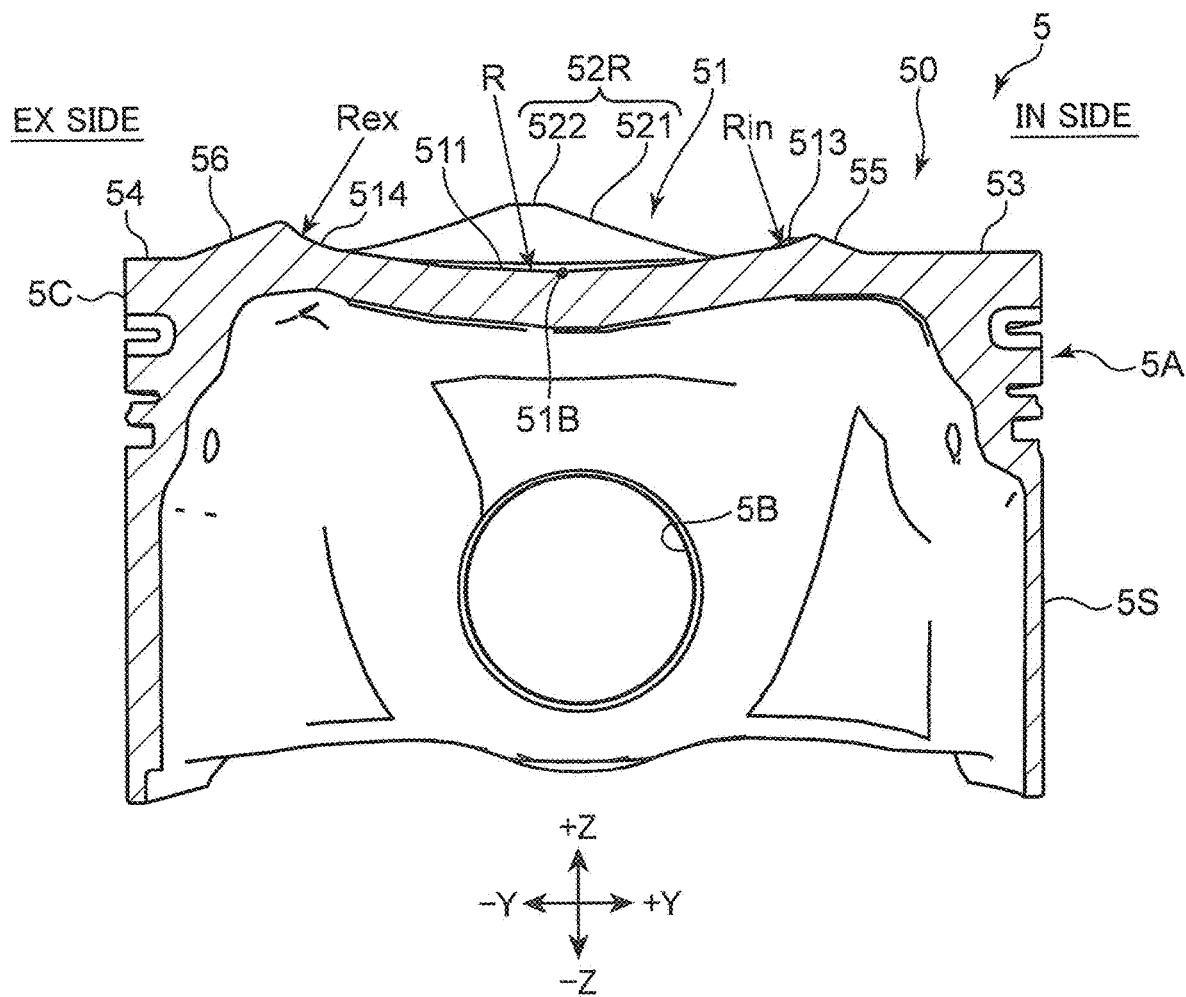
FIG. 11 is a sectional view taken along line XI-XI in FIG. 9.

Subsequently, with reference to FIG. 8 to FIG. 11, a structure of the piston 5, in particular, a structure of the crown surface 50 will be described in detail. In the present embodiment, the crown surface 50 has a shape so devised as to maintain both the above-described tumble flow and swirl flow to the vicinity of the compression top dead center. FIG. 8 is a perspective view of the piston 5 shown in FIG. 1 and FIG. 2, FIG. 9 is a plan view of the crown surface 50, FIG. 10 is a sectional view taken along line X-X in FIG. 9, and FIG. 11 is a sectional view taken along line XI-XI in FIG. 9. FIG. 8 to FIG. 11 are additionally given indication of XYZ directions for guaranteeing definitiveness of the explanation. The Z direction corresponds to a cylinder shaft AX direction, the X direction corresponds to a front-rear direction of the engine main body 1 as an extension direction of the crank shaft 7, and the Y direction corresponds to a direction orthogonal to both the Z direction and the X direction. Each figure is given indication of an F side (a +X side) and an R side (a −X side) representing a front side and a rear side in an installation direction of the engine main body 1, and an IN side (a +Y side) and an EX side (a −Y side) representing sides opposed to the intake port 9 and the exhaust port 10, respectively.

The piston 5 includes a piston head 5A, and a skirt portion 5S provided continuously with a lower portion of the piston head 5A (a −Z side). The piston head 5A is formed with a columnar body and includes, on its upper surface, the crown surface 50 which forms a part (a bottom surface) of the wall surface of the combustion chamber 6, and also includes a side circumferential surface 5C which slidably contacts with the inner wall surface of the cylinder 2. The side circumferential surface 5C is provided with a plurality of ring grooves in which piston rings are embedded. The skirt portion 5S is arranged on the +Y side and the −Y side of the piston head 5A to suppress oscillation swing during reciprocation of the piston 5. A piston boss 5B which zones a pin hole extending in the X direction is provided below the piston head 5A. A piston pin for joining with the connecting rod 8 is inserted into the pin hole of the piston boss 5B.

The crown surface 50 is a surface opposed to the combustion chamber ceiling surface 6U in the Z direction. The crown surface 50 includes the bowl-shaped cavity 51 arranged at an approximately central portion in a radial direction (the X direction and the Y direction) of the crown surface 50. The cavity 51 receives fuel injection from the injector 15, and is recessed downward (the −Z side) from the crown surface 50. Although "recessed" here signifies, when assuming a crown surface shape along the pent roof-shaped combustion chamber ceiling surface 6U, a recess at the radially central portion, the cavity 51 may not necessarily form the lowest part in the crown surface 50.

In a plan view from a +Z side, there are arranged, in an outer circumferential portion surrounding the cavity 51 in the crown surface 50, an F side projection portion 52F, an R side projection portion 52R, an IN side plane portion 53, an EX side plane portion 54, an IN side slope portion 55, and an EX side slope portion 56. The F side projection portion 52F and the R side projection portion 52R are projected surfaces adjacent on the +X side and the −X side of the cavity 51, respectively. The IN side plane portion 53 and the EX side plane portion 54 are planes positioned on the +Y side and the −Y side of the cavity 51, respectively. The IN side slope portion 55 is a slope arranged between a +Y side edge of the cavity 51 and the IN side plane portion 53. The EX side slope portion 56 is a slope arranged between an −Y side edge of the cavity 51 and the EX side plane portion 54.

The F side projection portion 52F and the R side projection portion 52R (a pair of first raised portions) are provided in an outer circumferential region between the cavity 51 in the crown surface 50 and the side circumferential surface 5C (outer edge portion) of the piston 5 to protrude in a +Z direction (cylinder axis direction). The F side projection portion 52F and the R side projection portion 52R are each configured by a pair of slope portions 521 and a ridge portion 522. The pair of slope portions 521 forms a mound-shaped slope along a pent roof shape of the combustion chamber ceiling surface 6U. The ridge portion 522 is a plane extending to have a belt-shape in the X direction in a top portion of the pair of slope portions 521. As shown in FIG. 9, the cavity 51 has an oval shape with the X direction as a longer axis in a plan view from the +Z side (a top view of the crown surface 50). In other words, the cavity 51 has an oval shape wide in an extending direction of the ridge portion 522. The F side projection portion 52F and the R side projection portion 52R have a generally U-shape which crosses the longer axis of the cavity 51. An F side plane portion 523F and an R side plane portion 523R formed of circular-arc belt-shaped planes are arranged adjacent to an outer circumference side of the F side projection portion 52F and an outer circumference side of the R side projection portion 52R, respectively.

The IN side plane portion 53 is a bow-shaped plane with a +Y side outer circumferential edge (the side circumferential surface 5C) of the crown surface 50 as an arc and with a straight line extending in the X direction as a bowstring. The IN side plane portion 53 is a squish area in which a squish flow is formed when the piston 5 goes toward the compression top dead center. The EX side plane portion 54 is a bow-shaped plane with a −Y side outer circumferential edge of the crown surface 50 as an arc and a straight line extending in the X direction as a bowstring. In the present embodiment, the IN side plane portion 53 is set to have a larger area than the EX side plane portion 54. According to this area difference, a bottom of a −Y side slope portion 521 of each of the F side and R side projection portions 52F and 52R is longer than a +Y side slope portion 521. The IN side plane portion 53, the EX side plane portion 54, the F side plane portion 523F, and the R side plane portion 523R are planes at approximately the same height. Of these planes, the IN side plane portion 53 is set to be a reference surface for determining a height position of each portion during processing of the crown surface 50.

The IN side slope portion 55 (a second raised portion) and the EX side slope portion protrude at a position in an outer circumferential region of the cavity 51 of the crown surface 50, the position being in a direction (+Y and −Y directions) orthogonal to the extending direction (the X direction) of the ridge portion 522 in the outer circumferential region of the cavity 51. The IN side slope portion 55 is a slope which creeps up to the +Z side toward a radially inner side (the −Y side) of the crown surface 50, with a position of the bowstring of the IN side plane portion 53 as a rising position, and reaches the +Y side edge of the cavity 51. The EX side slope portion 56 is a slope which creeps up to the +Z side toward the radially inner side (the +Y side) of the crown surface 50, with a position of the bowstring of the EX side plane portion 54 as a rising position, and reaches the −Y side edge of the cavity 51.

With respect to the bottom portion of each slope portion 521, the IN side slope portion 55 and the EX side slope portion 56 are present at high positions with a stepped portion 524 formed in a boundary between the slope portions. A part recessed by formation of the stepped portion 524 becomes a valve recess which prevents interference with the intake valve 11 and the exhaust valve 12. In other words, the IN side slope portion 55 is a raised portion formed between the pair of valve recesses for the intake valve 11, and the EX side slope portion 56 is a raised portion formed between the pair of valve recesses for the exhaust valve 12.

As shown in FIG. 11, the ridge portion 522 of each of the F side projection portion 52F and the R side projection portion 52R is at a position higher than a creep-up height (a height position protruding most to the +Z side) of the IN side slope portion 55 and the EX side slope portion 56. Additionally, the EX side slope portion 56 is longer in the Y direction than the IN side slope portion 55. Both the slope portions 55 and 56 have approximately the same angle of inclination, the EX side slope portion 56 having a higher protrusion height than the slope portion 55 in the +Z side larger by the length in the Y direction.

The cavity 51 includes a bottom portion 511, an F side peripheral wall 512F, an R side peripheral wall 512R, an IN side peripheral wall 513, and an EX side peripheral wall 514. The bottom portion 511 forms a lower region of the recessed cavity 51 with a bowl-shape. The bottom portion 511 is formed with a curved surface which is gradually recessed in the −Z direction and has an outer circumferential edge which has a circular shape in a plan view from the +Z side. At a radial center of the bottom portion 511, a deepest portion 51B is located which is a position in the cavity 51 recessed most to the −Z side. The deepest portion 51B is present at a position slightly shifted to the EX side relative to a radial center of the piston 5. The F side peripheral wall 512F is a curved surface rising from a +X side circumferential edge of the bottom portion 511 toward the F side projection portion 52F. The R side peripheral wall 512R is a curved surface rising from an −X side circumferential edge of the bottom portion 511 toward the R side projection portion 52R. The F side peripheral wall 512F and the R side peripheral wall 512R are the highest at a position of each ridge portion 522 and are gradually reduced in height toward the bottom of the slope portion 521. Radii of curvatures Rf and Rr of the curved surfaces of the F side peripheral wall 512F and the R side peripheral wall 512R are smaller than a radius of curvature R of the curved surface of the bottom portion 511.

The IN side peripheral wall 513 is a curved surface rising from a +Y side circumferential edge of the bottom portion 511 toward the IN side slope portion 55. The EX side peripheral wall 514 is a curved surface rising from a −Y side circumferential edge of the bottom portion 511 toward the EX side slope portion 56. Radii of curvatures Rin and Rex of the curved surfaces of the IN side peripheral wall 513 and the EX side peripheral wall 514 are also smaller than the radius of curvature R of the curved surface of the bottom portion 511. Since an interval between valve recesses on the IN side is larger than that on the EX side, the IN side peripheral wall 513 has a larger width in a circumferential direction than the EX side peripheral wall 514.

[Various Parameters of Cavity]

Figure 12:
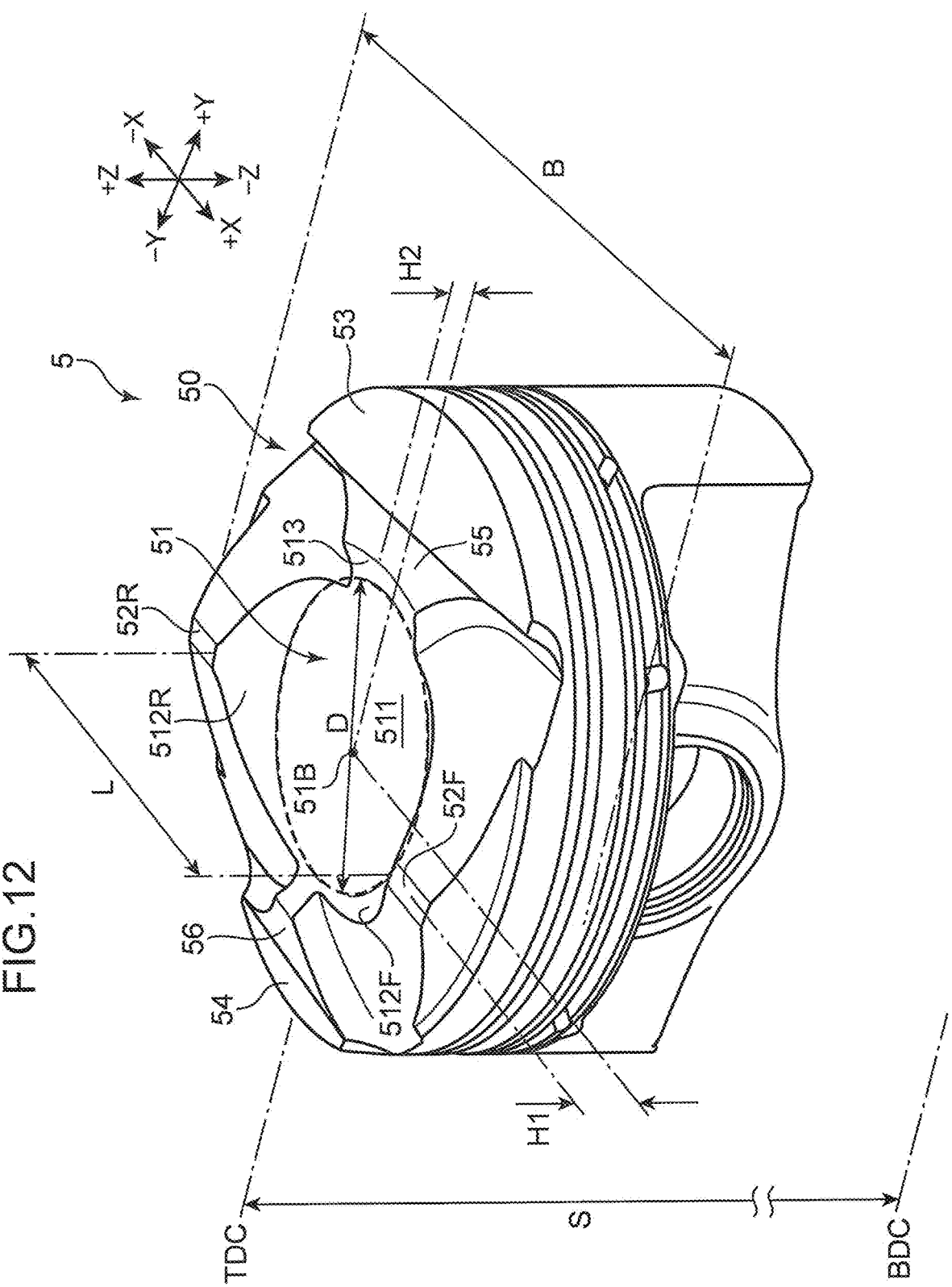
FIG. 12 is a perspective view of the piston, with various kinds of parameters related to a cavity additionally shown.

FIG. 12 is a view showing various kinds of parameters related to the cavity 51. In the figure, there are shown an FR peripheral wall height H1 (a height of the first raised portion), an IN side peripheral wall height H2 (a height of the second raised portion), a cavity diameter D, an F-R peripheral wall length L, the bore diameter B, and the stroke S. The FR peripheral wall height H1 represents a height of the F side projection portion 52F or the R side projection portion 52R, in other words, a height of the R side peripheral wall 512R or the F side peripheral wall 512F. The IN side peripheral wall height H2 represents a height of creep-up of the IN side slope portion 55, in other words, a height of the IN side peripheral wall 513. The heights H1 and H2 are heights from the deepest portion 51B (a predetermined reference height position) of the cavity 51.

The cavity diameter D represents a diameter of an outer circumferential edge of a region, including the deepest portion 51B and having a fixed curvature, of the cavity 51, and is a diameter of the bottom portion 511 in the present embodiment. The F-R peripheral wall length L represents an interval between the F side projection portion 52F and the R side projection portion 52R, in other words, an interval between an upper most portion of the R side peripheral wall 512R (an inner edge of the ridge portion 522) and an upper most portion of the F side peripheral wall 512F. The bore diameter B represents an inner diameter of the cylinder 2 as shown in FIG. 2, and represents a length corresponding to a diameter of the piston 5. The stroke S represents a length of movement of the piston 5 between the TDC (top dead center) and the BDC (bottom dead center) in the Z direction.

FIG. 10 and FIG. 11 also show parameters related to a curved surface shape of the cavity 51. In these figures, the radii R, Rf, Rr, Rin, and Rex are shown. The radius R represents a radius of the curved surface forming the bottom portion 511 of the cavity 51. An outer circumferential edge of a region recessed with the radius R is a boundary between the bottom portion 511 and the other peripheral walls 512R, 512F, 513, and 514, the boundary having a circular shape (a diameter of the circle=the cavity diameter D) in a top view. The radius Rf and the radius Rr are radii of the curved surfaces of the F side peripheral wall 512F and the R side peripheral wall 512R, respectively. On a cross-section of the cavity 51 taken along the X direction, the regions with the radii Rf and Rr (the F side peripheral wall 512F and the R side peripheral wall 512R) are provided continuously with the +X side and −X side end portions of the region with the radius R (the bottom portion 511), respectively. The radius Rin and the radius Rex are radii of the curved surfaces of the IN side peripheral wall 513 and the EX side peripheral wall 514, respectively. On a cross-section of the cavity 51 taken along the Y direction, the regions with the radii Rin and Rex (the IN side peripheral wall 513 and the REX side peripheral wall 514) are provided continuously with the +Y side and −Y side end portions of the region with the radius R (the bottom portion 511), respectively.

In the present embodiment, the F side projection portion 52F and the R side projection portion 52R (the pair of first raised portions) having a mound-shape along the pent roof shape are set to be higher than the IN side slope portion 55 (the second raised portion) positioned in a direction orthogonal to the pair of first raised portions within a predetermined range. Specifically, H1/H2 as a ratio of an FR peripheral wall height H1 to an IN side peripheral wall height H2 is set to satisfy the following relation in view of mainly maintaining a swirl flow until the later period of the compression stroke in the SPCCI combustion:

$$H1/H2=1.79 \text{ to } 3.29 \quad (1),$$

in which "1.79 to 3.29" indicates 1.79 or more and 3.29 or less (the same is applied hereinafter, except for a case where "larger than" is noted).

H1/H2 is set to be within the range indicated by Formula (1) above, and thus the F side projection portion 52F and the R side projection portion 52R having a mound-shape along the pent roof shape are set to be higher than the IN side slope portion 55 and the EX side plane portion 54 positioned in a direction orthogonal to the F side and R side projection portions 52F and 52R within a predetermined range (H1/H2=1.79 or more and 3.29 or less). In other words, H1/H2 is set so as to prevent a height ratio of the F side projection portion 52F and the R side projection portion 52R to the IN side slope portion 55 and the EX side plane portion 54 from becoming too high. It is therefore possible to guide a swirl flow by the F side projection portion 52F and the R side projection portion 52R (the F side peripheral wall 512F and the R side peripheral wall 512R), which makes it easy to maintain a swirl flow within the cavity 51. Accordingly, when conducting the SPCCI combustion, it is possible to maintain a swirl flow until the later period of the compression stroke in which the combustion chamber 6 has a smaller capacity. When H1/H2 becomes less than 1.79, it will be more likely that the F side projection portion 52F and the R side projection portion 52R become relatively lower than the IN side slope portion 55, so that the effect of guiding a swirl flow is reduced, the effect being obtained by the F side peripheral wall 512F and the R side peripheral wall 512R. When H1/H2 is larger than 3.29, it will be more likely that the swirl flow cannot circle in the region of the IN side slope portion 55 relatively so lower than the F side projection portion 52F and the R side projection portion 52R, resulting in disabling maintenance of the swirl flow.

Next, H1/H2 is set to satisfy the following relation in view of maintaining a swirl flow until the later period of the compression stroke in the SPCCI combustion and also maintaining a tumble flow until the later period of the compression stroke in the high-rotation SI combustion using the SI combustion and the SPCCI combustion in combination:

$$H1/H2=1.92 \text{ to } 2.75 \quad (2).$$

In the combustion chamber 6 including the pent roof-shaped combustion chamber ceiling surface 6U, intake air flows into a direction (the Y direction) orthogonal to a direction (the X direction) in which the ridge portions 522 of the F side projection portion 52F and the R side projection portion 52R extend to form a tumble flow. Accordingly, the tumble flow is guided by the F side projection portion 52F and the R side projection portion 52R (the F side peripheral wall 512F and the R side peripheral wall 512R) positioned on +X and −X side portions of the cavity 51 and higher than the IN side slope portion 55 (the IN side peripheral wall 513) within the above range of the relation of H1/H2. This allows a tumble flow to be gathered in the cavity 51 with ease and enables the tumble flow to be maintained until the later period of the compression stroke. On the other hand, H1/H2 is set so as to prevent a height ratio of the F side projection portion 52F and the R side projection portion 52R to the IN side slope portion 55 from becoming too high. This enables a swirl flow to be guided by the region of the IN side slope portion 55 (the IN side peripheral wall 513), so that the swirl flow can be maintained in the cavity 51 with ease. It is therefore possible to maintain a swirl flow until the later period of the compression stroke in which the combustion chamber 6 has a smaller capacity. When H1/H2 becomes less than 1.92, it will be more likely that an effect of guiding the tumble flow is reduced due to a shortage in height of the F side projection portion 52F and the R side projection portion 52R, the effect being obtained by the F side projection portion 52F and the R side projection portion 52R. When H1/H2 is larger than 2.75, it will be more likely that a tumble flow will be hardly guided in the region of the IN side slope portion 55 relatively so lower than the F side projection portion 52F and the R side projection portion 52R, resulting in disabling maintenance of the tumble flow.

Preferable setting, other than the above H1/H2, related to maintenance of a swirl flow and a tumble flow is as follows. First, regarding a relation between the FR peripheral wall height H1 and the cavity diameter D, in a case of mainly taking into consideration the maintenance of a swirl flow in the SPCCI combustion, it is desirable to satisfy the following relation:

$$H1/D=0.05 \text{ to } 0.36.$$

Satisfying the above relation leads to normalization of a relation between an opening diameter of the cavity 51 and heights of the F side projection portion 52F and the R side projection portion 52R to increase an effect of guiding the swirl flow. In a case of taking into consideration the maintenance of the swirl flow and the tumble flow in combined use of the SI combustion and the SPCCI combustion, it is desirable to satisfy the following relation:

$H1/D = 0.050$ to $0.235$.

Setting H1/D to be within the above range makes it easier also for a tumble flow to be guided by the F side projection portion 52F and the R side projection portion 52R having an appropriate height H1, thereby increasing an effect of maintaining a tumble flow.

Regarding a relation between the cavity diameter D and the bore diameter B, in a case of mainly taking into consideration the maintenance of a swirl flow in the SPCCI combustion, it is desirable to satisfy the following relation:

$B/D = 1.19$ to $2.94$.

In a case of taking into consideration the maintenance of a swirl flow and a tumble flow in combined use of the SI combustion and the SPCCI combustion, it is desirable to satisfy the following relation:

$B/D = 1.19$ to $2.20$.

Regarding a relation between the F-R peripheral wall length L and the bore diameter B, in a case of mainly taking into consideration the maintenance of a swirl flow in the SPCCI combustion, it is desirable to satisfy the following relation:

$B/L =$ more than $1.0$ and up to $2.86$.

In a case of taking into consideration the maintenance of a swirl flow and a tumble flow in combined use of the SI combustion and the SPCCI combustion, it is desirable to satisfy the following relation:

$B/L =$ more than $1.0$ and up to $1.52$.

Regarding a relation between the radius R of the bottom portion 511 of the cavity 51, and the bore diameter B and the stroke S, in a case of mainly taking into consideration the maintenance of a swirl flow in the SPCCI combustion, it is desirable to satisfy the following relation:

$R/B =$ more than $0.0$ and up to $2.42$.

In a case of taking into consideration the maintenance of a swirl flow and a tumble flow in combined use of the SI combustion and the SPCCI combustion, it is desirable to satisfy the following relation:

$R/B = 1.06$ to $2.42$.

Regarding a relation between the radius R of the bottom portion 511 of the cavity 51, and the radius Rf of the F side peripheral wall 512F and the radius Rr of the R side peripheral wall 512R, in a case of mainly taking into consideration the maintenance of a swirl flow in the SPCCI combustion, it is desirable to satisfy the following relation:

$R/Rf = R/Rr =$ more than $1$ and up to $64$.

In a case of taking into consideration the maintenance of a swirl flow and a tumble flow in combined use of the SI combustion and the SPCCI combustion, it is desirable to satisfy the following relation:

$R/Rf = R/Rr =$ more than $1$ and up to $12$.

Regarding a relation between the radius R, and the radius Rin of the IN side peripheral wall 513 and the radius Rex of the EX side peripheral wall 514, in a case of mainly taking into consideration the maintenance of a swirl flow in the SPCCI combustion, it is desirable to satisfy the following relation:

$R/Rin = R/Rex =$ more than $1$ and up to $78$.

In a case of taking into consideration the maintenance of a swirl flow and a tumble flow in combined use of the SI combustion and the SPCCI combustion, it is desirable to satisfy the following relation:

$R/Rin = R/Rex =$ more than $1$ and up to $14.5$.

[Description of In-Cylinder Circulation]

Figure 13:
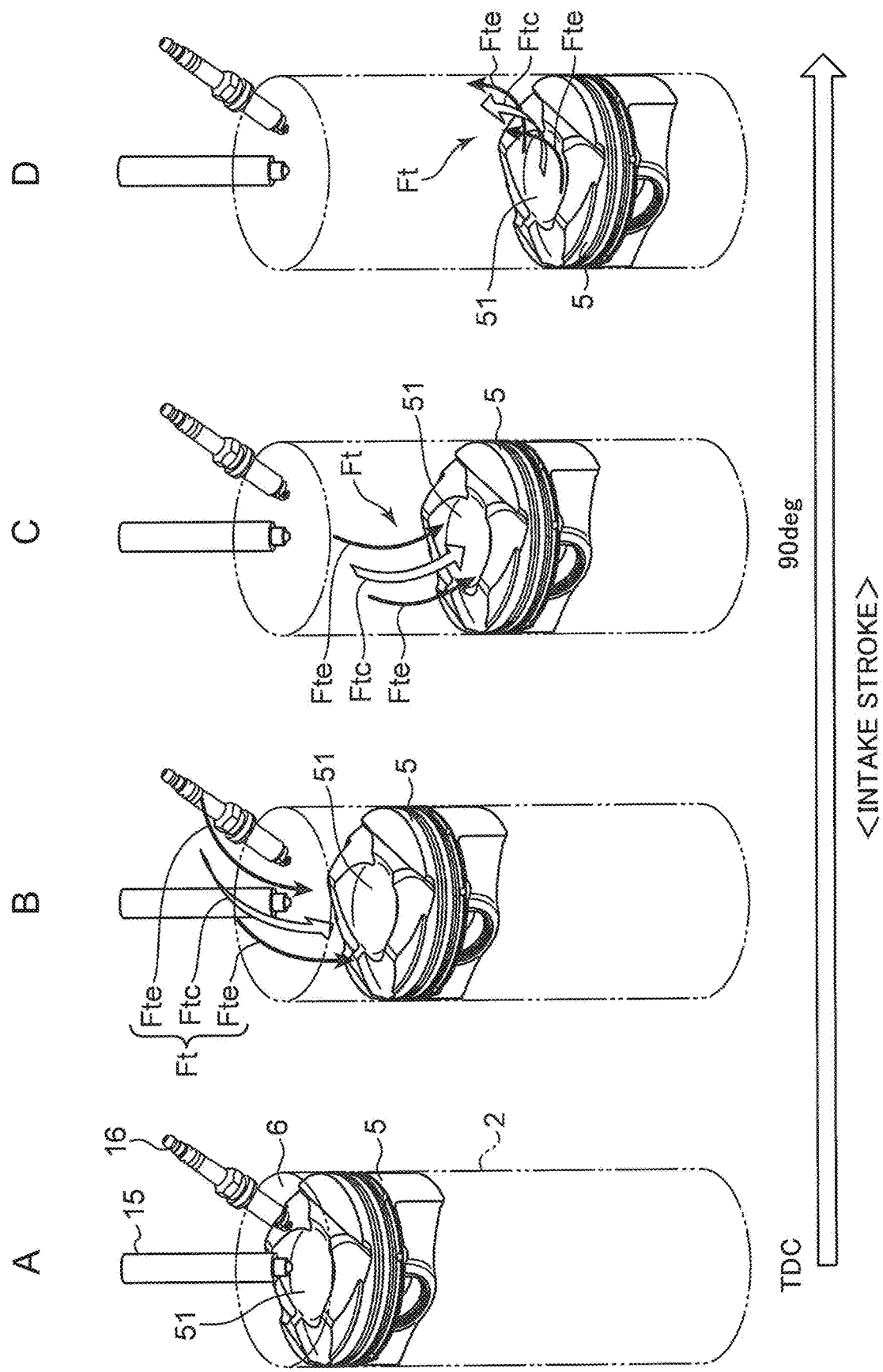
FIG. 13 is a view schematically showing circulation of a tumble flow in an intake stroke.
Figure 15B:
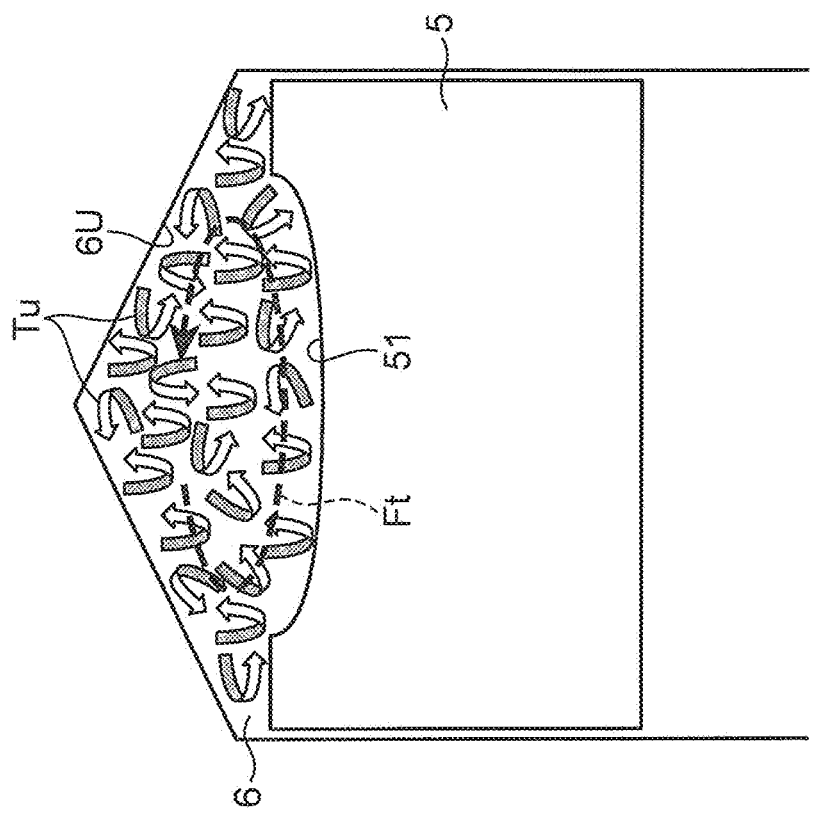
FIG. 15B is a schematic sectional view of the combustion chamber at a compression TDC.

In the following, with reference to FIG. 13 to FIG. 18, description will be made of in-cylinder circulation in a case where the piston 5 having the cavity 51 according to the present embodiment is used. FIG. 13 to FIG. 15 show a condition where a tumble flow essential in the third operation region (SI combustion) illustrated in FIG. 5 is maintained. FIG. 16 to FIG. 18 show a condition where a swirl flow essential in the first and second operation regions (SPCCI combustion) is maintained. In FIG. 13, FIG. 14, FIG. 16, and FIG. 17, while the cylinder 2 is shown in a simplified manner, a positional relation among the piston 5, the injector 15, and the ignition plug 16 is also shown.

<Tumble Flow>

FIG. 13 is a view schematically showing circulation of a tumble flow in the intake stroke of the SI combustion. Here, by way of example, a tumble ratio of 2 is shown (a tumble flow makes two rotations between an exhaust TDC and a compression TDC). FIG. 13 at A shows a state where the piston 5 is at a position of the exhaust TDC. In this state, the intake valve 11 is not opened, and no fresh air flows from the intake port 9 into the cylinder 2 (the combustion chamber 6).

FIG. 13 at B shows a state where the piston 5 descends from the exhaust TDC by approximately 45 deg. In this state, the intake valve 11 is opened, and fresh air flows from the intake port 9 into the cylinder 2 (the combustion chamber 6) due to pressure reduction caused by descending of the piston 5. Since as is already described, the intake port 9 has a shape of a tumble port, in-flow of the fresh air causes a tumble flow Ft to be generated in the cylinder 2. The tumble flow Ft includes a central tumble flow Ftc and an outer edge tumble flow Fte. The central tumble flow Ftc is relatively strong circulation directed to a radially central region of the cavity 51. The outer edge tumble flow Fte is circulation generated at both sides of the central tumble flow Ftc, the circulation being relatively weak circulation directed to a radially circumferential edge region of the cavity 51. Since in the SI combustion, the swirl valve 17 is fully opened, fresh air flows from the two intake ports 9A and 9B into the cylinder 2. Interference of the fresh air flowing from the two intake ports 9A and 9B into the cylinder 2 causes generation of the relatively strong central tumble flow Ftc in the radially central region.

FIG. 13 at C shows a state where the piston 5 descends from the exhaust TDC by 90 deg. The tumble flow Ft enters the cavity 51. In detail, the central tumble flow Ftc enters the radially central region of the cavity 51 and the outer edge tumble flow Fte enters the radially circumferential edge region. FIG. 13 at D shows a state where the piston 5 descends from the exhaust TDC by approximately 135 deg. Being guided by the cavity 51, both the central tumble flow Ftc and the outer edge tumble flow Fte invert the circulation direction upward. As illustrated in FIG. 6, the injector 15 injects fuel in the intake stroke at timing according to operation scene.

FIG. 14 is a view schematically showing circulation of the tumble flow Ft in the compression stroke. FIG. 14 at A shows a state where the piston 5 is at a position of an intake BDC. The intake valve 11 is closed near the intake BDC and mixture gas in the combustion chamber 6 starts being compressed. At this stage, the tumble flow Ft circulates so as to be directed to the combustion chamber ceiling surface 6U.

FIG. 14 at B shows a state where the piston 5 rises from the intake BDC by approximately 45 deg. Being guided by the combustion chamber ceiling surface 6U, the tumble flow Ft inverts the circulation direction downward. Again, the central tumble flow Ftc is directed to the radially central region of the cavity 51 and the outer edge tumble flow Fte is directed to the radially circumferential edge region.

FIG. 14 at C shows a state where the piston 5 rises from the intake BDC by 90 deg. The central tumble flow Ftc enters the radially central region of the cavity 51 and the outer edge tumble flow Fte enters the radially circumferential edge region, and those flows are guided by the cavity 51. FIG. 14 at D shows a state where the piston 5 rises from the intake BDC by approximately 135 deg. Since even after reaching the later period of the compression stroke, the cavity 51 has wide area and capacity and includes the F side projection portion 52F and the R side projection portion 52R with heights satisfying the relation of H1/H2 of Formula (2) above, the tumble flow Ft is maintained. However, as the capacity of the combustion chamber 6 is reduced, the outer edge tumble flow Fte is liable to be lost, so that mainly the central tumble flow Ftc remains. As illustrated in FIG. 6, the ignition plug 16 ignites mixture gas at timing according to operation scene in the compression stroke.

Figure 15A:
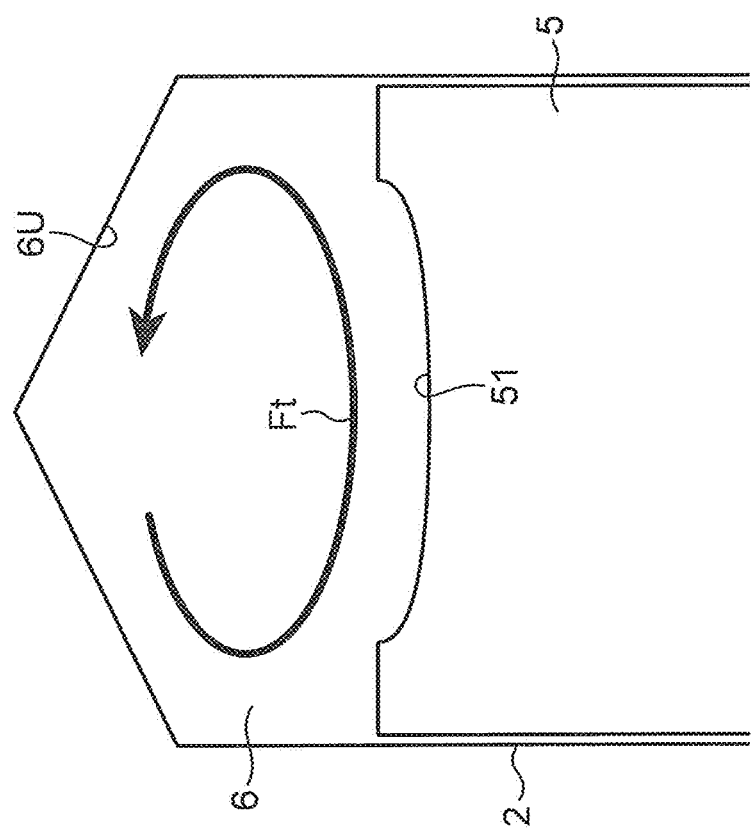
FIG. 15A is a schematic sectional view of the combustion chamber corresponding to a state shown in FIG. 14 at D.
Figure 16:
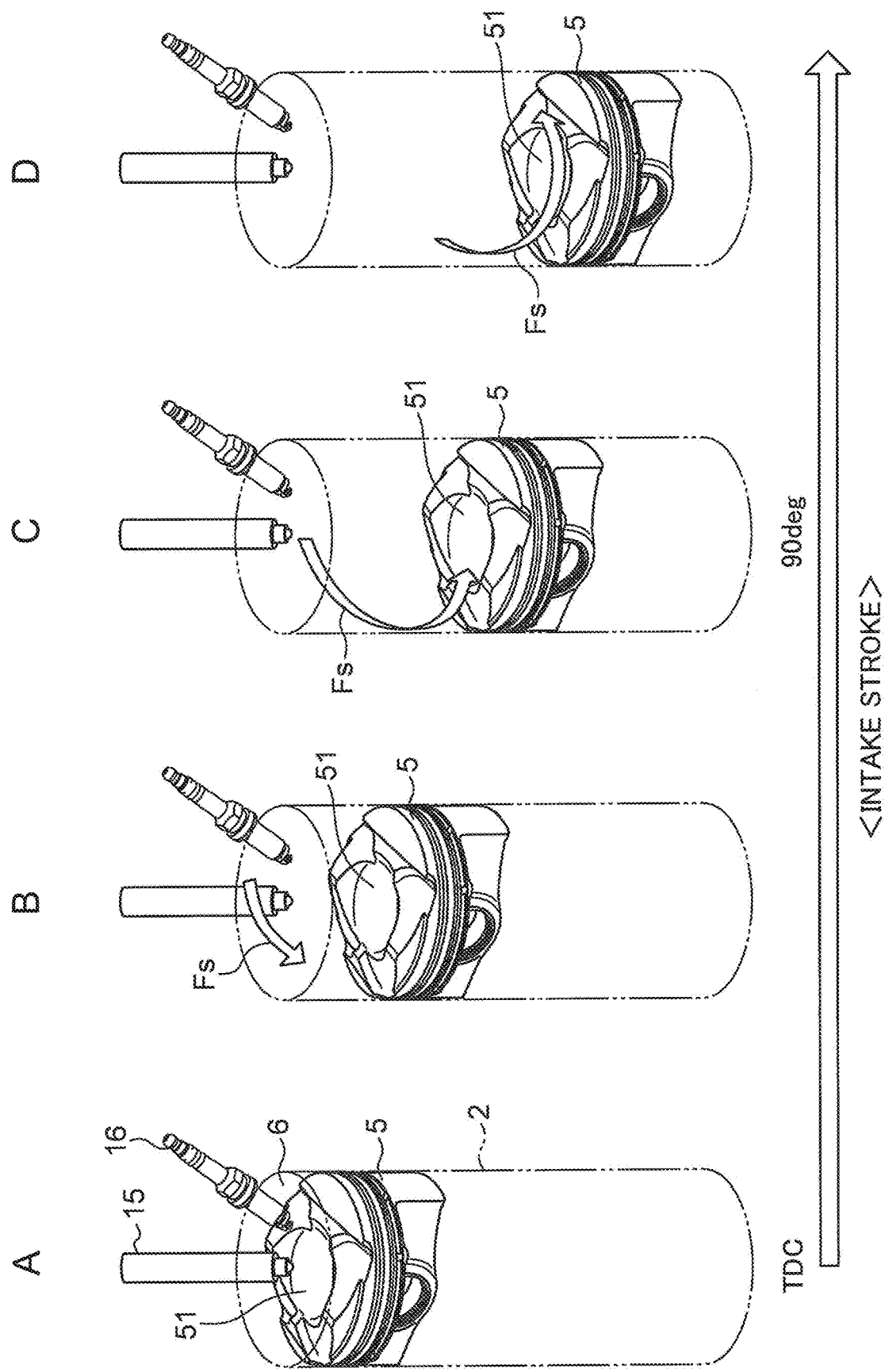
FIG. 16 is a view schematically showing circulation of a swirl flow in the intake stroke.

FIG. 15A is a schematic sectional view taken along a cylinder axis direction of the combustion chamber 6, which corresponds to the state shown in FIG. 14 at D. FIG. 15B is a schematic sectional view taken along the cylinder axis direction of the combustion chamber 6 at the compression TDC, in which the piston 5 is further raised from the state shown in FIG. 14 at D. In the state of the later period of the compression stroke shown in FIG. 15A, the tumble flow Ft is maintained as described above.

Thereafter, as shown in FIG. 15B, when reaching the compression TDC, the tumble flow Ft is converted into a turbulent flow Tu at once. The turbulent flow Tu is generated by shift of each gas component of mixture gas in a random direction, the mixture gas having formed a laminar flow in a form of the tumble flow Ft and then having lost room for escape due to reduction in the space of the combustion chamber 6. At this time point, the tumble flow Ft will be substantially lost. By maintaining the tumble flow Ft as much as possible and converting the tumble flow Ft into the turbulent flow Tu at once near the compression TDC, speed-up of flame propagation in the SI combustion is realized to increase thermal efficiency. The cavity 51 according to the present embodiment which satisfies the relation of H1/H2 shown by Formula (2) above contributes to such maintenance of a tumble flow as much as possible.

<Swirl Flow>

FIG. 16 is a view schematically showing circulation of a swirl flow in the intake stroke. FIG. 16 at A shows a state where the piston 5 is at the position of the exhaust TDC. In this state, the intake valve 11 is not opened, and no fresh air flows from the intake port 9 into the cylinder 2 (the combustion chamber 6). As described above, when generation of a swirl flow is required in the SPCCI combustion, the opening of the swirl valve 17 is limited, so that fresh air is introduced mainly from the intake port 9A (FIG. 3).

FIG. 16 at B shows a state where the piston 5 descends from the exhaust TDC by approximately 45 deg. In this state, the intake valve 11 is opened, and fresh air flows from the intake port 9A into the cylinder 2 due to pressure reduction caused by descending of the piston 5. Therefore, a swirl flow Fs is generated in the combustion chamber 6.

Here, since the intake port 9 is a tumble port, the swirl flow Fs becomes an oblique swirl flow which descends obliquely downward being affected by a tumble flow.

FIG. 16 at C shows a state where the piston 5 descends from the exhaust TDC by 90 deg. The swirl flow Fs proceeds toward the cavity 51 while largely circling obliquely downward. FIG. 16 at D shows a state where the piston 5 descends from the exhaust TDC by approximately 135 deg. A part of the swirl flow Fs enters the cavity 51 and circles around while being guided by the cavity 51.

FIG. 17 is a view schematically showing circulation of the swirl flow Fs in the compression stroke. FIG. 17 at A shows a state where the piston 5 is at a position of the intake BDC. The intake valve 11 is closed near the intake BDC, so that mixture gas in the combustion chamber 6 starts being compressed. At this stage, the swirl flow Fs circulates obliquely upward toward the combustion chamber ceiling surface 6U while circling around also due to the guiding effect by the cavity 51.

FIG. 17 at B shows a state where the piston 5 rises from the intake BDC by approximately 45 deg. While being guided by the combustion chamber ceiling surface 6U, the swirl flow Fs circles around with its circulation direction inverted obliquely downward. As a result, the swirl flow Fs again goes toward the cavity 51.

FIG. 17 at C shows a state where the piston 5 rises from the intake BDC by 90 deg. Until the compression stroke middle period, the swirl flow Fs maintains a state of the oblique swirl flow. A part of the swirl flow Fs enters the cavity 51 and is guided by the cavity 51. FIG. 17 at D shows a state where the piston 5 rises from the intake BDC by approximately 135 deg. When reaching the later period of the compression stroke, as the capacity of the combustion chamber 6 is reduced, the swirl flow Fs enters a state of a lateral swirl flow with an oblique component substantially lost.

Figure 18B:
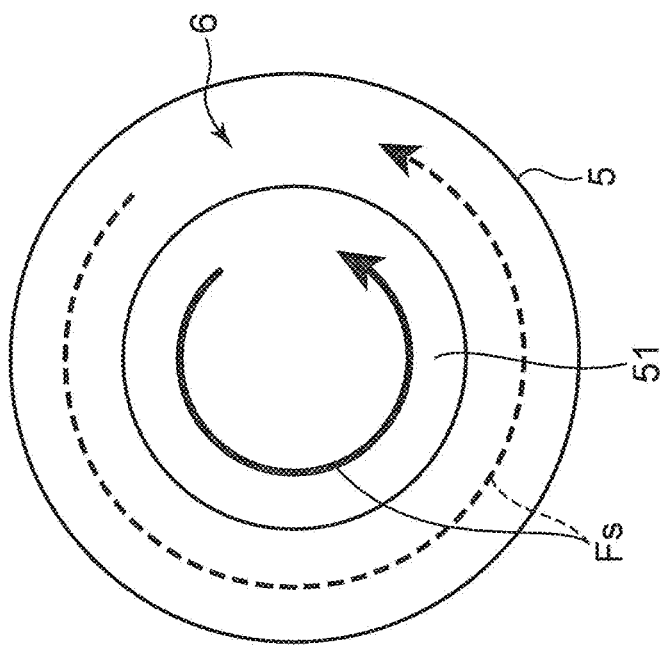
FIG. 18B is a schematic view showing a state of generation of the swirl flow in the combustion chamber at the compression TDC.
Figure 18A:
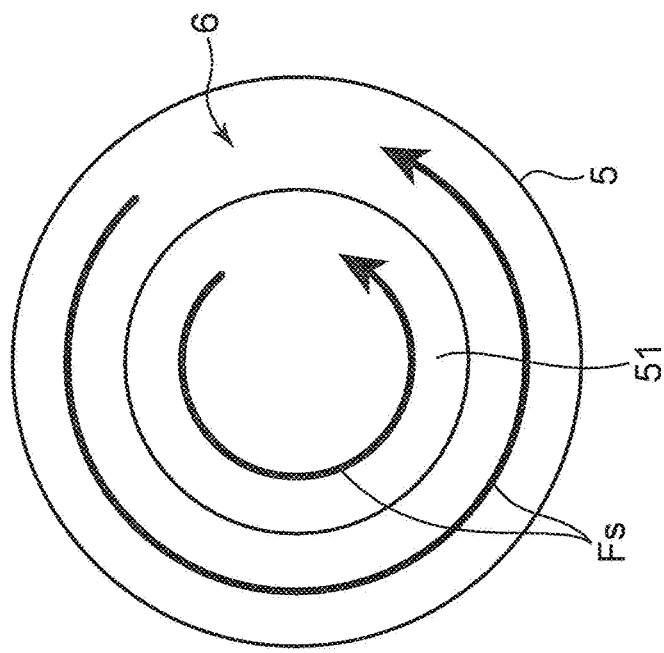
FIG. 18A is a schematic view showing a state of generation of the swirl flow in the combustion chamber, the state corresponding to the state shown in FIG. 17 at D.

FIG. 18A is a schematic view showing a state of generation of the swirl flow Fs in the combustion chamber 6, the state corresponding to the state shown in FIG. 17 at D. FIG. 18B is a schematic view showing a state of generation of the swirl flow Fs in the combustion chamber 6 at the compression TDC. In the state of the later period of the compression stroke shown in FIG. 18A, the swirl flow Fs is maintained in the cavity 51 and on the outer circumference side of the cavity 51.

Thereafter, while when reaching the compression TDC, the swirl flow Fs on the outer circumference side of the cavity 51 is lost as shown in FIG. 18B, the swirl flow Fs is maintained in the cavity 51. Maintaining the swirl flow to the vicinity of the compression TDC, kindling generated near the ignition plug 16 with the intension of SI combustion at the preceding stage can be carried out to a circumferential edge region of the combustion chamber 6, thereby accelerating compression ignition in the CI combustion at the later stage. The F side projection portion 52F, the R side projection portion 52R, and the IN side slope portion 55 having the heights satisfying at least the relation of H1/H2 shown in Formula (1) above contribute to such maintenance of the swirl flow Fs.

[Effect of Maintaining Tumble Flow and Swirl Flow]

Figure 19:
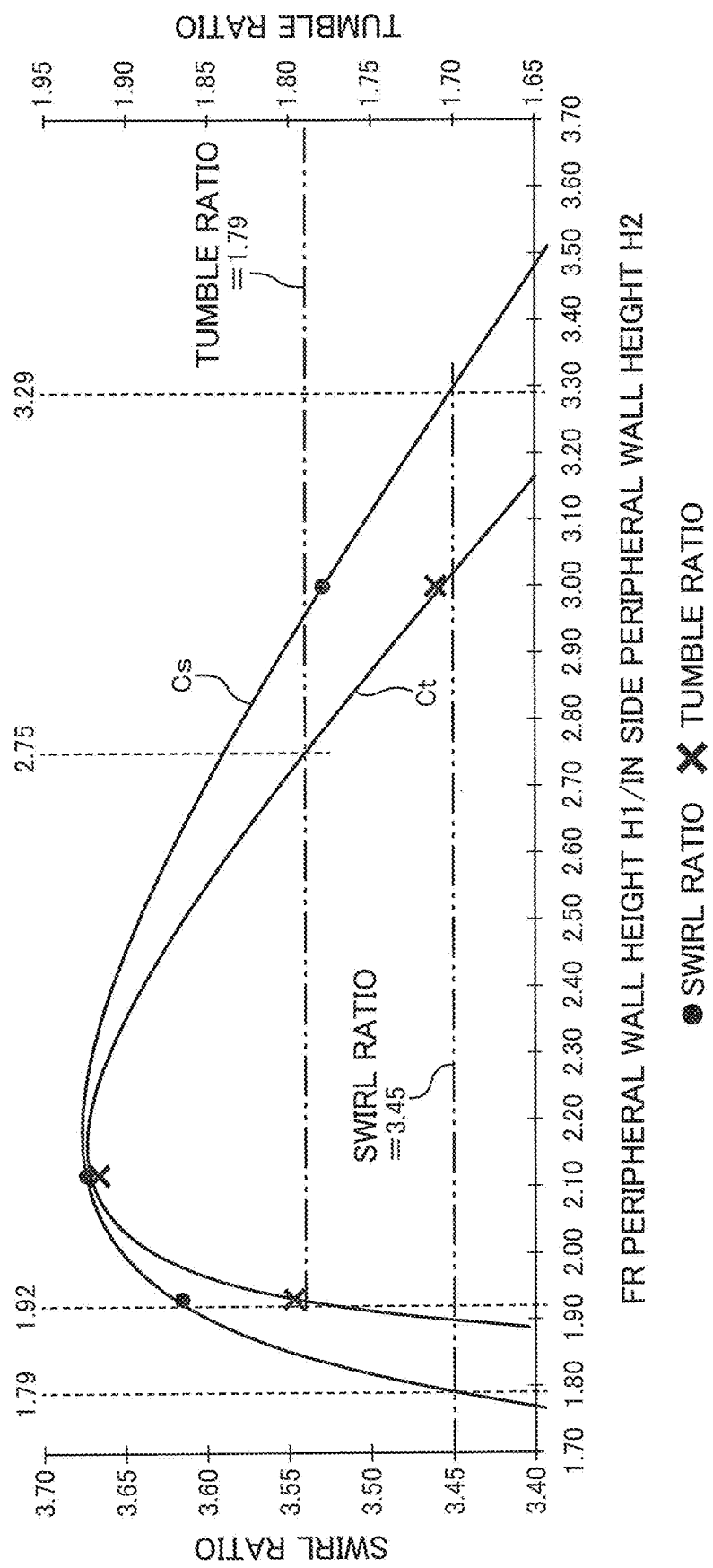
FIG. 19 is a graph showing an effect of maintaining a tumble flow and a swirl flow when the present embodiment is adopted.

FIG. 19 is a graph showing an effect of maintaining a tumble flow and a swirl flow when the present embodiment is adopted. A horizontal axis of the graph represents a value of H1/H2 and a vertical axis represents values of a swirl ratio and a tumble ratio which are evaluation values of degrees of continuance of a tumble flow and a swirl flow. Here, values of the swirl ratio and the tumble ratio are plotted when the value of H1/H2 is set to be:

3.00; $H1=7.00$ mm, $H2=2.34$ mm, 2.12; $H1=11.50$ mm, $H2=5.13$ mm, and 1.93; $H1=8.49$ mm, $H2=4.39$ mm, in which the bore diameter B=83.5 mm and the stroke S=91.2 mm. FIG. 19 further shows a swirl ratio property Cs and a tumble ratio property Ct which are approximate curves based on the respective plots. The swirl ratio property Cs and the tumble ratio property Ct are curves showing a relation between H1/H2 and the swirl ratio and the tumble ratio, respectively.

For realizing excellent SPCCI combustion, from an engine low rotation region toward a high rotation region, the swirl ratio should be 3.45 or more. The swirl ratio being less than 3.45 means that the swirl flow Fs horizontally circling around in the combustion chamber 6 for realizing SPCCI combustion is not enough. There are two points of intersection between a line of the swirl ratio of 3.45 and the swirl ratio property Cs, H1/H2=1.79 and H1/H2=3.29, which are a lower limit value and an upper limit value of Formula (1) above.

As illustrated in the operation map of FIG. 5, in a case where SPCCI combustion is executed in a low to medium rotation region and SI combustion is executed in the high rotation region, for realizing excellent SI combustion, the tumble ratio should be 1.79 or more. The tumble ratio being less than 1.79 means that the tumble flow Ft vertically circling around in the combustion chamber 6 for realizing SI combustion is not enough. There are two points of intersection between a line of the tumble ratio of 1.79 and the tumble ratio property Ct, H1/H2=1.92 and H1/H2=2.75, which are a lower limit value and an upper limit value of Formula (2) above.

In addition to the above demonstrative example, the effect of maintaining the tumble flow and swirl flow will be graphically explained. FIG. 20A is a schematic view showing the tumble flow in a case where H1/H2 is set to be within an appropriate range. Here, the central tumble flow Ftc and the outer edge tumble flow Fte illustrated in FIG. 13 to FIG. 14 are shown as in-cylinder circulation. In a case where H1/H2 is normalized, the tumble flow Ft is collected in a region where the cavity 51 is formed to continuously present even after reaching the later period of the compression stroke by using the space of the cavity 51. Specifically, the central tumble flow Ftc circulates so as to be guided by the bottom portion 511 of the cavity 51, and the outer edge tumble flow Fte circulates so as to be guided by the F side peripheral wall 512F and the R side peripheral wall 512R formed by raises of the F side projection portion 52F and the R side projection portion 52R. Therefore, it is possible to allow the tumble flow Ft to continue until the later period of the compression stroke with ease.

By contrast, FIG. 20B is a schematic view showing the tumble flow Ft in a case where H1/H2 is below the lower limit of Formula (2) above. The value of H1/H2 being small means that the F side peripheral wall 512F and the R side peripheral wall 512R have small heights, resulting in that the outer edge tumble flow Fte is short of a function as a guide surface. In this case, as shown in FIG. 20B, the outer edge tumble flow Fte is hardly guided into a region where the cavity 51 is formed in the crown surface 50, so that a strong tumble flow Ft is hardly formed due to convergence of both the central tumble flow Ftc and the outer edge tumble flow Fte in the cavity 51. Therefore, continuance of the tumble flow Ft is reduced (the tumble ratio is reduced). In a case where H1/H2 exceeds the upper limit of Formula (2) above, the IN side peripheral wall 513 forming the IN side slope portion 55 is so low that the effect of guiding to the central tumble flow Ftc is curbed, resulting in reducing a tumble ratio also in this case.

FIG. 21A is a schematic view showing the swirl flow in a case where H1/H2 is set to be within an appropriate range. Here, the swirl flow Fs illustrated in FIG. 16 to FIG. 17 is shown as in-cylinder circulation. In a case where H1/H2 is normalized, the swirl flow Fs is guided by the F side peripheral wall 512F, the R side peripheral wall 512R, the IN side peripheral wall 513, and the EX side peripheral wall 514 to maintain circulation in the cavity 51 with a large diameter. Therefore, it is possible to allow the swirl flow Fs to continue until the later period of the compression stroke with ease.

By contrast, FIG. 21B is a schematic view showing the swirl flow in a case where H1/H2 is above the upper limit of Formula (1) above. The value of H1/H2 being large means that a difference in height between the F side peripheral wall 512F and the R side peripheral wall 512R, and the IN side peripheral wall 513 and the EX side peripheral wall 514 is large. As a result, the swirl flow Fs is hardly guided in the regions of the IN side peripheral wall 513 and the EX side peripheral wall 514 and easily goes out from the cavity 51 to a radially outer side. In other words, because the IN side peripheral wall 513 and the EX side peripheral wall 514 are so small in height that the swirl flow Fs will leak out from a gap between the F side peripheral wall 512F and the R side peripheral wall 512R to an outer circumference side. Therefore, continuance of the swirl flow Fs is reduced (the swirl ratio is reduced). In a case where H1/H2 is below the lower limit of Formula (1) above, the F side peripheral wall 512F and the R side peripheral wall 512R will have insufficient height, so that the effect of guiding the swirl flow Fs by the F side peripheral wall 512F and the R side peripheral wall 512R will be reduced, resulting in reducing a swirl ratio.

[Modification]

Although the embodiment of the present invention has been described in the foregoing, the present invention is not limited thereto and can assume various modifications. For example, in the above embodiment, in addition to Formulas (1) and (2) above, the numerical value ranges are shown also for H1/D, D/B, B/F, R/B, R/Rf and R/Rr, and R/Rin and R/Rex. These values may be outside of the above illustrated numerical value range as long as the numerical value range of H1/H2 satisfies the ranges of Formulas (1) and (2) above.

In the above-described specific embodiment, a combustion chamber structure for an engine having the following configuration is disclosed.

A combustion chamber structure for an engine according to one aspect of the present invention includes a combustion chamber defined by a crown surface of a piston, an inner wall surface of a cylinder in which the piston is slidably housed, and a pent roof-shaped ceiling surface. In this combustion chamber, partial compression ignition combustion in which mixture gas combusts by flame propagation and then combusts by compression ignition is performed. The crown surface includes a cavity recessed to have a bowl-shape; a pair of first raised portions having a mound-shape along the pent roof shape of the ceiling surface and provided in an outer circumferential region between the cavity and an outer edge portion of the piston to protrude in a cylinder axis direction; and a second raised portion provided to protrude, in the outer circumferential region, at a position orthogonal to a ridge extending direction of the pair of first raised portions. With a height of the first raised portion relative to a height position of a deepest portion of the cavity being represented as H1 and a height of the second raised portion being represented as H2, H1/H2 as a ratio of the height H1 of the first raised portion to the height H2 of the second raised portion is set to be in a range of 1.79 or more and 3.29 or less.

According to this combustion chamber structure, the first raised portion having a mound-shape along the pent roof shape is set to be higher than the second raised portion positioned in a direction orthogonal to the first raised portion within a predetermined range (H1/H2=1.79 or more and 3.29 or less). Specifically, since H1/H2 is set so as to prevent a height ratio of the first raised portion to the second raised portion from becoming too high, it is possible to guide a swirl flow even in the region of the second raised portion, which makes it easy to maintain the swirl flow within the cavity. Accordingly, when conducting the partial compression ignition combustion (SPCCI combustion), it is possible to maintain the swirl flow until the later period of the compression stroke in which the combustion chamber has a smaller capacity. When H1/H2 becomes less than 1.79, it will be more likely that the first raised portion becomes relatively lower, so that the effect of guiding a swirl flow is reduced, the effect being obtained by the first raised portion. When H1/H2 is larger than 3.29, it will be more likely that the swirl flow cannot circle in the region of the second raised portion which is relatively so lower than the first raised portion, resulting in disabling maintenance of the swirl flow.

A combustion chamber structure for an engine according to another aspect of the present invention includes a combustion chamber defined by a crown surface of a piston, an inner wall surface of a cylinder in which the piston is slidably housed, and a pent roof-shaped ceiling surface. In this combustion chamber, flame propagation combustion and partial compression ignition combustion are conducted in combination, the flame propagation combustion being a mode in which mixture gas combusts by flame propagation, the partial compression ignition combustion being a mode in which mixture gas combusts by flame propagation and then combusts by compression ignition. The crown surface includes a cavity recessed to have a bowl-shape; a pair of first raised portions having a mound-shape along the pent roof shape of the ceiling surface and provided in an outer circumferential region between the cavity and an outer edge portion of the piston to protrude in a cylinder axis direction; and a second raised portion provided to protrude, in the outer circumferential region, at a position orthogonal to a ridge extending direction of the pair of first raised portions. With a height of the first raised portion relative to a height position of a deepest portion of the cavity being represented as H1 and a height of the second raised portion being represented as H2, H1/H2 as a ratio of the height H1 of the first raised portion to the height H2 of the second raised portion is set to be in a range of 1.92 or more and 2.75 or less.

According to this combustion chamber structure, setting H1/H2 to be within the above range enables an increase in the effect of maintaining both the tumble flow and swirl flow in an engine using the SI combustion and the SPCCI combustion in combination. Specifically, in the combustion chamber including the pent roof-shaped ceiling surface, intake air flows into a direction orthogonal to the ridge extending direction to form a tumble flow. Accordingly, the tumble flow is guided by the first raised portions positioned on side portions of the cavity and higher than the second raised portion. This allows a tumble flow to be gathered in the cavity with ease, and enables the tumble flow to be maintained until the later period of the compression stroke. On the other hand, since H1/H2 is set so as to prevent a height ratio of the first raised portion to the second raised portion from becoming too high, the swirl flow can be guided by a region of the second raised portion, and the swirl flow can be maintained in the cavity with ease. It is accordingly possible to maintain a swirl flow until the later period of the compression stroke in which the combustion chamber has a smaller capacity. When H1/H2 becomes less than 1.92, it will be more likely that an effect of guiding a tumble flow is reduced due to a shortage in height of the first raised portion, the effect obtained by the first raised portion. When H1/H2 becomes larger than 2.75, it will be more likely that a tumble flow will be hardly guided in the region of the second raised portion relatively so lower than the first raised portion, resulting in disabling maintenance of the tumble flow.

In the above combustion chamber structure, the cylinder preferably has a geometrical compression ratio set to be a high compression ratio of 15 or more.

This combustion chamber structure realizes a combustion chamber suitable to conduct the SPCCI combustion in which compression ignition of a part of fuel is conducted.

In the above combustion chamber structure, the cavity preferably has an oval shape wide in the ridge extending direction in a top view of the crown surface.

Since in the combustion chamber structure, the cavity has a shape wide in a tumble flow circulation direction, the tumble flow can be guided by the first raised portion with ease.

According to the foregoing described present invention, it is possible to provide, in an engine in which SPCCI combustion is conducted, a combustion chamber structure for an engine in which a swirl flow can be maintained until a later period of a compression stroke, and to provide, in an engine using SI combustion and SPCCI combustion in combination, a combustion chamber structure for an engine in which both a tumble flow and a swirl flow can be maintained until the later period of the compression stroke.

This application is based on Japanese Patent application No. 2018-215642 filed in Japan Patent Office on Nov. 16, 2018, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An engine, comprising:
  a combustion chamber defined by a crown surface of a piston, an inner wall surface of a cylinder in which the piston is slidably housed, and a pent roof-shaped ceiling surface provided with an intake port and an exhaust port, wherein
  the engine is configured to perform, in the combustion chamber, partial compression ignition combustion in which mixture gas combusts by flame propagation and then combusts by compression ignition,
  the crown surface includes:
    a cavity recessed to have a bowl-shape;
    a pair of first raised portions having a mound-shape along the pent roof shape of the ceiling surface and provided in an outer circumferential region between the cavity and an outer edge portion of the piston to protrude in a cylinder axis direction, the pair of first raised portions each including a ridge having a greatest dimension along a ridge extending direction; and
a second raised portion provided to protrude in a convex shape at an intake side opposed to the intake port, in the outer circumferential region, at a position orthogonal to the ridge extending direction of the pair of first raised portions, and
with a height of an uppermost portion of the first raised portion relative to a height position of a deepest portion of the cavity being represented as H1 and a height of an uppermost portion of the second raised portion in the cylinder axis direction relative to the height position of the deepest portion being represented as H2, H1/H2 as a ratio of the height H1 of the first raised portion to the height H2 of the second raised portion is set to be in a range of 1.79 or more and 3.29 or less.

2. The engine according to claim 1, wherein the cylinder has a geometric compression ratio set to be 15 or more and 30 or less.

3. The engine according to claim 1, wherein the cavity has an oval shape wide in the ridge extending direction in a top view of the crown surface.

4. The engine according to claim 2, wherein the cavity has an oval shape wide in the ridge extending direction in a top view of the crown surface.

5. The engine according to claim 1, wherein a combustion mode of the partial compression ignition combustion is a combustion mode in which:
   a part of mixture gas in the combustion chamber is subjected to SI combustion by spark ignition which is conducted under an environment immediately before the mixture gas has self-ignition, and
   after the SI combustion, due to further higher temperature and higher pressure following the SI combustion, the remaining mixture gas in the combustion chamber is subjected to the compression ignition combustion by self-ignition.

6. The engine according to claim 1, wherein the crown surface further includes an intake side plane portion having an outer circumferential edge of the crown surface in the intake side formed as an arc with a straight line extending in the ridge extending direction along a chord of the arc, and
the second raised portion is a slope which gradually rises toward a radially inner side of the crown surface, with a position of the chord of the intake side plane portion as a rising position, and reaches an intake side edge of the cavity.

7. The engine according to claim 1, wherein an intake valve is provided in the intake port and an exhaust valve is provided in the exhaust port,
each of the first raised portions includes a first slope portion at the intake side and a second slope portion at an exhaust side opposed to the exhaust port,
the crown surface further includes an intake side slope portion arranged between an outer circumferential edge of the crown surface in the intake side and an edge of the cavity in the intake side, and an exhaust side slope portion arranged between an outer circumferential edge of the crown surface in the exhaust side and an edge of the cavity in the exhaust side,
the intake side slope portion is present at a high position, with respect to the first slope portion, with a first stepped portion in a boundary between the intake side slope portion and the first slope portion,
the exhaust side slope portion is present at a high position, with respect to the second slope portion, with a second stepped portion in the boundary between the exhaust side slope portion and the second slope portion,
a part recessed by formation of the first stepped portion becomes a valve recess for the intake valve preventing interference with the intake valve, and
a part recessed by formation of the second stepped portion becomes a valve recess for the exhaust valve preventing interference with the exhaust valve.

8. The engine according to claim 5, wherein the partial compression ignition combustion is executed in an operation region including a heaviest load region of the engine.

9. An engine, comprising:
a combustion chamber defined by a crown surface of a piston, an inner wall surface of a cylinder in which the piston is slidably housed, and a pent roof-shaped ceiling surface provided with an intake port and an exhaust port, wherein
the engine is configured to perform, in the combustion chamber, flame propagation combustion and partial compression ignition combustion in combination, the flame propagation combustion being a mode in which mixture gas combusts by flame propagation, the partial compression ignition combustion being a mode in which mixture gas combusts by flame propagation and then combusts by compression ignition,
the crown surface includes:
   a cavity recessed to have a bowl-shape;
   a pair of first raised portions having a mound-shape along the pent roof shape of the ceiling surface and provided in an outer circumferential region between the cavity and an outer edge portion of the piston to protrude in a cylinder axis direction, the pair of first raised portions each including a ridge having a greatest dimension along a ridge extending direction; and
   a second raised portion provided to protrude in a convex shape at an intake side opposed to the intake port, in the outer circumferential region, at a position orthogonal to the ridge extending direction of the pair of first raised portions, and
with a height of an uppermost portion of the first raised portion relative to a height position of a deepest portion of the cavity being represented as H1 and a height of an uppermost portion of the second raised portion in the cylinder axis direction relative to the height position of the deepest portion being represented as H2, H1/H2 as a ratio of the height H1 of the first raised portion to the height H2 of the second raised portion is set to be in a range of 1.92 or more and 2.75 or less.

10. The engine according to claim 9, wherein the cylinder has a geometric compression ratio set to be 15 or more and 30 or less.

11. The engine according to claim 9, wherein the cavity has an oval shape wide in the ridge extending direction in a top view of the crown surface.

12. The engine according to claim 10, wherein the cavity has an oval shape wide in the ridge extending direction in a top view of the crown surface.

13. The engine according to claim 9, wherein a combustion mode of the partial compression ignition combustion is a combustion mode in which:

a part of mixture gas in the combustion chamber is subjected to SI combustion by spark ignition which is conducted under an environment immediately before the mixture gas has self-ignition, and after the SI combustion, due to further higher temperature and higher pressure following the SI combustion, the remaining mixture gas in the combustion chamber is subjected to the compression ignition combustion by self-ignition.

14. The engine according to claim 9, wherein the crown surface further includes an intake side plane portion having an outer circumferential edge of the crown surface in the intake side formed as an arc with a straight line extending in the ridge extending direction along a chord of the arc, and the second raised portion is a slope which gradually rises toward a radially inner side of the crown surface, with a position of the chord of the intake side plane portion as a rising position, and reaches an intake side edge of the cavity.

15. The engine according to claim 9, wherein an intake valve is provided in the intake port and an exhaust valve is provided in the exhaust port, each of the first raised portions includes a first slope portion at the intake side and a second slope portion at an exhaust side opposed to the exhaust port, the crown surface further includes an intake side slope portion arranged between an outer circumferential edge of the crown surface in the intake side and an edge of the cavity in the intake side, and an exhaust side slope portion arranged between an outer circumferential edge of the crown surface in the exhaust side and an edge of the cavity in the exhaust side, the intake side slope portion is present at a high position, with respect to the first slope portion, with a first stepped portion in a boundary between the intake side slope portion and the first slope portion, the exhaust side slope portion is present at a high position, with respect to the second slope portion, with a second stepped portion in the boundary between the exhaust side slope portion and the second slope portion, a part recessed by formation of the first stepped portion becomes a valve recess for the intake valve preventing interference with the intake valve, and a part recessed by formation of the second stepped portion becomes a valve recess for the exhaust valve preventing interference with the exhaust valve.

16. The engine according to claim 13, wherein the partial compression ignition combustion is executed in an operation region including a heaviest load region of the engine.

* * * * *